(12) United States Patent
Kawanishi

(10) Patent No.: US 8,525,049 B2
(45) Date of Patent: *Sep. 3, 2013

(54) COMBINATION WEIGHER HAVING REDUCED BATCH TIME AND IMPROVED OPERATIONAL SPEED

(76) Inventor: Shozo Kawanishi, Nishinomiya (JP)

( * ) Notice: Subject to any disclaimer, the term of this patent is extended or adjusted under 35 U.S.C. 154(b) by 523 days.

This patent is subject to a terminal disclaimer.

(21) Appl. No.: 12/678,728

(22) PCT Filed: Jul. 10, 2008

(86) PCT No.: PCT/JP2008/001846
§ 371 (c)(1),
(2), (4) Date: May 21, 2010

(87) PCT Pub. No.: WO2009/037800
PCT Pub. Date: Mar. 26, 2009

(65) Prior Publication Data
US 2010/0243339 A1  Sep. 30, 2010

(30) Foreign Application Priority Data

Sep. 18, 2007 (JP) ................. 2007-240640

(51) Int. Cl.
*G01G 19/387* (2006.01)

(52) U.S. Cl.
USPC ....................................... 177/25.18

(58) Field of Classification Search
USPC ....................................... 177/25.18
See application file for complete search history.

(56) References Cited

U.S. PATENT DOCUMENTS 4,676,326 A * 6/1987 Konishi ............................ 177/1
4,840,240 A * 6/1989 Toyoda et al. ............. 177/25.18
4,844,190 A * 7/1989 Mikami et al. ............. 177/25.18
8,119,935 B2 2/2012 Kawanishi
8,247,710 B2 * 8/2012 Kawanishi ................. 177/25.18
2009/0133939 A1* 5/2009 Taylor et al. .................. 177/108
2010/0224421 A1 9/2010 Kawanishi
2011/0036645 A1* 2/2011 Kageyama et al. ........ 177/25.18

FOREIGN PATENT DOCUMENTS

| JP | 60-178319 A | 9/1985 |
| JP | 62-091819 | 4/1987 |
| JP | 01-201118 A | 8/1989 |
| JP | 08-152353 | 6/1996 |
| JP | 2006-292610 A | 10/2006 |

OTHER PUBLICATIONS

Extended European Search Report for EP 08 790 197.1-2213, dated May 4, 2011.

(Continued)

*Primary Examiner* — Randy W Gibson
(74) *Attorney, Agent, or Firm* — Marshall, Gerstein & Borun LLP

(57) ABSTRACT

A combination weigher capable of high-speed operation comprises plural weighing units each of which includes a weighing hopper group including plural weighing hoppers arranged along an inner side of an imaginary circle and fed with objects; and a collecting chute disposed below the weighing hopper group and configured to collect the objects discharged from the weighing hoppers and to discharge the objects from a discharge outlet at a bottom part thereof, wherein weighing hopper groups of the respective weighing units include plural weighing hoppers arranged on inner sides of different imaginary circles, the different imaginary circles partially overlap with each other, and the weighing hoppers are not disposed in circular-arc regions of the imaginary circles corresponding to the overlapping region of the different imaginary circles.

1 Claim, 14 Drawing Sheets

(56) References Cited

OTHER PUBLICATIONS

International Search Report for PCT/JP2008/001846, mailed Oct. 14, 2008.
International Search Report for PCT/JP2008/001845, mailed Oct. 14, 2008.
Machine Translation for JP 08-152,353, Jul. 18, 2012.
Supplementary European Search Report for European Patent Application No. EP 08 79 0198, dated Apr. 28, 2011.

* cited by examiner (a)

(b)

(a)

(b)

(a)

(b)

(a)

(b)

(a)  (b)

(c)  (d)

COMBINATION WEIGHER HAVING REDUCED BATCH TIME AND IMPROVED OPERATIONAL SPEED

TECHNICAL FIELD

The present invention relates to a combination weigher which feeds to a packaging machine or the like, objects to be weighed which have been weighed.

BACKGROUND ART

Objects to be weighed, such as detergents and confectionary, which have been weighed to have a specified weight by a combination weigher, are typically packaged by a packaging machine (see e.g., Patent document 1).

Such a conventional combination weigher which weighs the objects to be weighed includes, for example, plural weighing hoppers for weighing the weights of the objects to be weighed, is configured to perform combination calculation in such a manner that the weights of the objects to be weighed held in these weighing hoppers are combined to determine a combination of weighing hoppers holding the objects to be weighed whose weight is equal to or closest to a combination target weight, and is configured to discharge the objects to be weighed corresponding to the combination to the packaging machine.

FIG. 13 shows a schematic construction of such a conventional combination weigher which weighs the objects to be weighed. The combination weigher is configured such that a control unit 30 controls the operation of the entire combination weigher and performs combination calculation. The combination weigher is constructed in such a manner that a center base body (body) 15 is disposed at a center of the combination weigher, and a dispersion feeder 1 having a conical shape is mounted to an upper part of the center base body 15 to radially disperse the objects to be weighed supplied from an external supplying device by vibration. Around the dispersion feeder 1, linear feeders 2 are provided to transfer the objects to be weighed which have been sent from the dispersion feeder 1 into respective feeding hoppers 3 by vibration. Plural feeding hoppers 3 and plural weighing hoppers 4 are disposed below the linear feeders 2 and are arranged in a circular form in such a manner that each feeding hopper 3 and each weighing hopper 4 correspond to the associated one of the linear feeders 2. The feeding hopper 3 receives the objects to be weighed which have been sent from the linear feeder 2, and opens its gate to feed the objects to be weighed to the weighing hopper 4 located therebelow when the weighing hopper 4 is emptied. The weighing hopper 4 is attached with a weight sensor 41 such as a load cell. The weight sensor 41 measures the weight of the objects to be weighed inside the weighing hopper 4. The control unit 30 performs combination calculation to select a combination (discharge combination) made up of hoppers which should discharge the objects to be weighed, from among the plural weighing hoppers 4. The weighing hoppers 4 corresponding to the discharge combination discharge the objects to be weighed onto a collecting chute 6. The collecting chute 6 is provided with a collecting hopper 7 at a discharge outlet of a bottom part thereof. The objects to be weighed which have been discharged from the weighing hoppers 4 slide down on the collecting chute 6, are held in the collecting hopper 7 and thereafter are discharged from the collecting hopper 7.

For example, a packaging machine shown in FIG. 14 is disposed below the collecting hopper 7. The objects to be weighed which have been discharged from the collecting hopper 7 are introduced into an inlet (upper opening of a tube 51) of the packaging machine While manufacturing package bags, the packaging machine of FIG. 14 charges the objects to be weighed which have been discharged from the combination weigher into the package bags and packages them.

Patent document 1: Examined Japanese Patent Application Publication No. Hei. 8-1395

DISCLOSURE OF THE INVENTION

Problems to be Solved by the Invention

In order to increase a productivity (total number of times the objects to be weighed are discharged to the packaging machine), the above described conventional combination weigher performs a high-speed operation at a maximum speed, for example. However, a batch length of the objects to be weighed, which slide down on the collecting chute 6 increases, depending on the characteristic of the objects to be weighed, such as bulky (bulk density is low) objects to be weighed, sticky objects to be weighed, etc. This increases a time period (this time period is called a batch time of the objects to be weighed on the collecting chute 6) from when a head portion of a batch of the objects to be weighed which have been discharged simultaneously from the plural weighing hoppers 4 reach a discharge outlet (collecting hopper 7) of the collecting chute 6 until a tail portion of a batch of the objects to be weighed reach the discharge outlet (collecting hopper 7) of the collecting chute 6.

In the combination weigher, the number of the weighing hoppers 4 which participate in combination calculation is increased in order to improve weighing accuracy or otherwise to maintain favorable weighing accuracy and improve a weighing speed by performing so-called a double shift operation, a triple shift operation, etc. In the case where the number of weighing hoppers 4 is increased in this way, the case where a capacity (volume) of the weighing hoppers 4 is large and therefore the length of arrangement pitch of the weighing hoppers 4 must be increased, or other cases, the arrangement shape (circular form in the example of FIG. 13) of the weighing hoppers 4 increases. This increases the size (diameter of an upper opening and height) of the collecting chute 6 increases and a transportation distance of the objects to be weighed on the collecting chute 6 increases. Thereby, the batch length of the objects to be weighed sliding down on the collecting chute 6 increases and the above batch time of the objects to be weighed on the collecting chute 6 increases. Furthermore, as described above, depending on the characteristic of the objects to be weighed, the batch length of the objects to be weighed sliding down on the collecting chute 6 further increases and the batch time of the objects to be weighed on the collecting chute 6 further increases.

When the batch time of the objects to be weighed on the collecting chute increases up to a time which is longer than a certain time (allowable batch time) assumed, a distance between a batch of the objects to be weighed which have been discharged from the weighing hoppers 4 selected to make up a previous discharge combination and a batch of the objects to be weighed which have been discharged from the weighing hoppers 4 selected to make up a next discharge combination becomes insufficient on the collecting chute 6 or otherwise they are mixed thereon unless the operation speed of the combination weigher is set slower. As a result, a correct operation cannot be performed.

The present invention has been made to solve the above mentioned problems, and an object of the present invention is to provide a combination weigher which is capable of reducing a batch time of objects to be weighed on a collecting chute and of a high-speed operation regardless of a characteristic of the objects to be weighed, etc.

Means for Solving the Problem

To achieve the above mentioned objective, a combination weigher of the present invention comprises plural weighing units each of which includes: a combination hopper group including plural combination hoppers which are arranged annularly and fed with objects to be weighed; an upper collecting chute which is disposed below the combination hopper group and configured to collect the objects to be weighed which have been discharged from the combination hoppers and to discharge the objects to be weighed from a discharge outlet at a bottom part thereof; and an upper collecting hopper which is provided at the discharge outlet of the upper collecting chute and configured to hold the objects to be weighed which have been discharged from the discharge outlet of the upper collecting chute, and to then discharge the objects to be weighed; a collecting and discharge means which is configured to collect the objects to be weighed which have been discharged from upper collecting hoppers of the plural weighing units and to discharge the objects to be weighed; and a control means which is configured to repetitively perform: a combination process in which combination calculation is performed based on weights of the objects to be weighed which are held in the combination hoppers in combination hopper groups of all of the weighing units to determine a combination of combination hoppers holding the objects to be weighed whose total weight falls within a predetermined weight range and the combination is determined as a discharge combination; a first discharge process for causing the combination hoppers making up the discharge combination determined in the combination process to discharge the objects to be weighed; and a second discharge process for causing the upper collecting hoppers to discharge all of the objects to be weighed which have been discharged from the combination hoppers and are held in the upper collecting hoppers.

In accordance with such a configuration, since a predetermined number of combination hoppers included in the combination weigher are divided into plural combination hopper groups, and plural weighing units respectively including the combination hopper groups are provided, it is possible to reduce the size of the upper collecting chute in each weighing unit, and the transportation distance and transportation time period of the objects to be weighed which are sliding down on each upper collecting chute, as compared to a combination weigher in which all of the combination hoppers are arranged in a single annular form (e.g., circular form), if the arrangement pitch and total number of the combination hoppers are equal. In addition, it is possible to collect the objects to be weighed which have been discharged from the combination hoppers onto each upper collecting chute, into each upper collecting hopper before its batch length gets large, hold therein the objects to be weighed in a lump state, and discharge the objects to be weighed in a lump state from each upper collecting hopper to the collecting and discharge means. As should be understood from the above, the batch time of the objects to be weighed on each upper collecting chute can be reduced, regardless of the characteristic of the objects to be weighed, the total number of the combination hoppers, etc, thereby enabling a high-speed operation. In addition, since the transportation distance of the objects to be weighed which are sliding down on each upper collecting chute is short, the maximum speed at the sliding down is suppressed to a low one. Thus, the impact generated when the objects to be weighed collide with each other, or the impact generated when the objects to be weighed entering each upper collecting hopper collide against the inner wall of the upper collecting hopper is mitigated, thereby preventing the damage to the objects to be weighed. Furthermore, since the combination hoppers are arranged in the plural annular forms, the installation area of the combination weigher can be reduced, in contrast to the combination weigher in which all of the combination hoppers are arranged in a single annular form (e.g., circular form).

The combination hopper groups in the respective weighing units may include plural combination hoppers arranged along inner sides of circumferences of plural different imaginary circles.

In this case, when the number of weighing units is expressed as N, the diameter of the imaginary circle in each weighing unit can be made 1/N of the diameter of a single imaginary circle formed by all of the combination hoppers arranged along the inner side of the circumference of the imaginary circle in the conventional combination weigher. Therefore, the diameter of each upper collecting chute can be reduced to approximately 1/N of the diameter of the collecting chute in the conventional combination weigher, and the installation area of the combination weigher can be reduced to approximately 1/N of the installation area of the conventional combination weigher.

The combination hopper groups may be configured such that the different imaginary circles may partially overlap with each other, and the combination hopper is not disposed in circular-arc regions of the imaginary circles corresponding to an overlapping region of the imaginary circles.

In this case, since no combination hopper is disposed in the region where the weighing units are adjacent each other. This therefore facilitates a dismounting work or a mounting work of the combination hoppers when the combination hoppers are cleaned, repaired, etc. The control means may be configured to perform the second discharge process such that all of the upper collecting hoppers discharge the objects to be weighed simultaneously.

Since all of the upper collecting hoppers operate at the same timing, the upper collecting hoppers can be easily controlled.

The collecting and discharge means may include a single lower collecting chute which is disposed below the upper collecting hoppers and configured to collect the objects to be weighed which have been discharged from all of the upper collecting hoppers and to discharge the objects to be weighed from a discharge outlet at a bottom part thereof to a packaging machine inlet. This configuration is referred to as a two-stage chute configuration.

In accordance with such a configuration, by reducing the size of the upper and lower collecting chutes, it is possible to reduce the transportation distance and transportation time period of the objects to be weighed which are sliding down on the upper and lower collecting chutes. It is possible to collect the objects to be weighed which have been discharged from the combination hoppers onto the upper collecting chute, into the upper collecting hopper, before its batch length gets large, to hold therein the objects to be weighed in a lump state, and to discharge the objects to be weighed in a lump state from the upper collecting hopper to the lower collecting chute. In addition, it is possible to discharge the objects to be weighed which have been discharged to the lower collecting chute, from the discharge outlet thereof, to the packaging machine inlet, before its batch length gets large. Therefore, the batch time of the objects to be weighed on the upper and lower collecting chutes can be reduced, regardless of the characteristic of the objects to be weighed, the total number of the combination hoppers, etc, thereby enabling a high-speed operation. Since the transportation distance over which the objects to be weighed slide down on the upper and lower collecting chutes is short, the maximum speed at the sliding down is suppressed to a low one. Thus, the impact generated when the objects to be weighed collide with each other, or the impact generated when the objects entering the upper collecting hopper collide against the inner wall of the upper collecting hopper is mitigated, thereby preventing the damage to the objects to be weighed.

The collecting and discharge means may include plural intermediate collecting chutes which are disposed below the upper collecting hoppers and configured to collect the objects to be weighed which have been discharged from plural different upper collecting hoppers and to discharge the objects to be weighed from discharge outlets at bottom parts thereof, plural intermediate collecting hoppers which are respectively provided at discharge outlets of the respective intermediate collecting chutes and to hold the objects to be weighed which have been discharged from the discharge outlets of the intermediate collecting chutes and to then discharge the objects to be weighed; and a single lower collecting chute which is disposed below the intermediate collecting hoppers and configured to collect the objects to be weighed which have been discharged from all of the intermediate collecting hoppers and to discharge the objects to be weighed from a discharge outlet at a bottom part thereof to a packaging machine inlet. This configuration is referred to as a three-stage chute configuration.

In accordance with such a configuration, by reducing the size of the upper, intermediate and lower collecting chutes, it is possible to reduce the transportation distance and transportation time period of the objects to be weighed which are sliding down on the upper, intermediate and lower collecting chutes. It is possible to collect the objects to be weighed which have been discharged from the combination hoppers to the upper collecting chute, into the upper collecting hopper, before its batch length gets large, hold therein the objects to be weighed in a lump state, and discharge the objects to be weighed in a lump state from the upper collecting hopper to the intermediate collecting chute. In addition, it is possible to collect into the intermediate collecting hopper, the objects to be weighed which have been discharged to the intermediate collecting chute before its batch length gets large, hold therein the objects to be weighed in a lump state, and discharge the objects to be weighed in a lump state from the intermediate collecting hopper to the lower collecting chute. In addition, it is possible to discharge the objects to be weighed which have been discharged to the lower collecting chute, from the discharge outlet thereof, to the packaging machine inlet, before its batch length gets large. Therefore, the batch time of the objects to be weighed on the upper, intermediate and lower collecting chutes can be reduced, regardless of the characteristic of the objects to be weighed, the total number of the combination hoppers, etc, thereby enabling a high-speed operation. Since the transportation distance over which the objects to be weighed slide down on the upper, intermediate and lower collecting chutes is short, the maximum speed at the sliding down is suppressed to a low one. Thus, the impact generated when the objects to be weighed collide with each other, or the impact generated when the objects entering the upper and intermediate collecting hoppers collide against the inner walls of the upper and intermediate collecting hoppers is mitigated, thereby preventing the damage to the objects to be weighed.

The collecting and discharge means may further include a lower collecting hopper which is provided at a discharge outlet of the lower collecting chute and configured to hold the objects to be weighed which have been discharged from the discharge outlet of the lower collecting chute and to then discharge the objects to be weighed.

In accordance with such a configuration, it is possible to collect into the lower collecting hopper, the objects to be weighed which have been discharged onto the lower collecting chute hand have a certain batch length (length), hold therein the objects to be weighed, and discharge the objects to be weighed from the lower collecting hopper to the packaging machine inlet in a lump state.

The collecting and discharge means may further include collecting chutes in plural stages from second stage to p-th (p: integer of 4 or more) stage which are disposed below a first-stage collecting chute consisting of the upper collecting chutes, and collecting hoppers which are respectively provided at discharge outlets of bottom parts of the collecting chutes in the second stage to (p−1)-th stage, configured to hold the objects to be weighed which have been discharged from the discharge outlets at the bottom parts of the collecting chutes and to then discharge the objects to be weighed, the collecting chute in q-th (q: integer in a range from 2 to p) stage is configured to collect the objects to be weighed which have been discharged from collecting hoppers respectively provided at discharge outlets of plural collecting chutes in (q−1)-th stage and to discharge the objects to be weighed from a discharge outlets at a bottom part thereof, and the objects to be weighed which have been discharged from the discharge outlet at the bottom part of the collecting chute in the p-th stage may be fed to the packaging machine inlet. This configuration is referred to as a multi-stage chute configuration.

In accordance with such a configuration, by reducing the size of the collecting chutes in first stage (upper stage) to p-th stage, it is possible to reduce the transportation distance and transportation time period of the objects to be weighed which are sliding down on each collecting chute. It is possible to collect the objects to be weighed which have been discharged to the collecting chutes in first stage to (p−1)-th stage, into the collecting hoppers provided at the respective collecting chutes, before its batch length gets large, discharge the objects to be weighed in a lump state from each collecting hopper to the collecting chute in a subsequent stage, and discharge the objects to be weighed which have been discharged to the collecting chute in the p-th stage which is a lowermost stage, from the discharge outlet thereof, to the packaging machine inlet, before its batch length gets large. Therefore, the batch time of the objects to be weighed on each collecting chute can be reduced, regardless of the characteristic of the objects to be weighed, the total number of the combination hoppers, etc thereby enabling a high-speed operation. Since the transportation distance over which the objects to be weighed slide down on each collecting chute is short, the maximum speed at the sliding down is suppressed to a low one. Thus, the impact generated when the objects to be weighed collide with each other, or the impact generated when the objects entering the collecting hopper collide against the inner wall of the collecting hopper is mitigated, thereby preventing the damage to the objects to be weighed.

The collecting and discharge means may further include a collecting hopper which is provided at a discharge outlet of the collecting chute in the p-th stage and configured to hold the objects to be weighed which have been discharged from the discharge outlet of the collecting chute in the p-th stage and to then discharge the objects to be weighed.

In accordance with such a configuration, the objects to be weighed can be discharged from the collecting hopper which is provided at the discharge outlet of the collecting chute in the p-th stage to the packaging machine inlet in a lump state.

The upper collecting hopper may be configured to discharge the objects to be weighed selectively in a first direction or in a second direction. The collecting and discharge means may include a first lower collecting chute which is disposed below the upper collecting hoppers and configured to collect the objects to be weighed which have been discharged from all of the upper collecting hoppers in the first direction and to discharge the objects to be weighed from a discharge outlet at a bottom part thereof to a first packaging machine inlet, and a second lower collecting chute which is disposed below the upper collecting hoppers and configured to collect the objects to be weighed which have been discharged from all of the upper collecting hoppers in the second direction and to discharge the objects to be weighed from a discharge outlet at a bottom part thereof to a second packaging machine inlet. The control means may be configured to cause all of the upper collecting hoppers to discharge the objects to be weighed alternately in the first and second directions, when repetitively performing the second discharge process. This configuration is referred to as a two-direction discharge configuration.

In accordance with such a configuration, it is possible to discharge the objects to be weighed to the first and second packaging machine inlets alternately. In addition, the same advantage as that of the two-stage chute configuration is achieved.

The upper collecting hopper may be configured to discharge the objects to be weighed selectively in a first direction or in a second direction. The collecting and discharge means may include plural first intermediate collecting chutes which are disposed below the upper collecting hoppers and configured to collect the objects to be weighed which have been discharged from plural different upper collecting hoppers in the first direction and to discharge the objects to be weighed from discharge outlets at bottom parts thereof, plural second intermediate collecting chutes which are disposed below the upper collecting hoppers and configured to collect the objects to be weighed which have been discharged from plural different upper collecting hoppers in the second direction and to discharge the objects to be weighed from discharge outlets at bottom parts thereof; plural first intermediate collecting hoppers which are respectively provided at the discharge outlets of the first intermediate collecting chutes and configured to hold the objects to be weighed which have been discharged from the discharge outlets of the first intermediate collecting chutes and to then discharge the objects to be weighed; plural second intermediate collecting hoppers which are respectively provided at the discharge outlets of the second intermediate collecting chutes and configured to hold the objects to be weighed which have been discharged from the discharge outlets of the second intermediate collecting chutes and to then discharge the objects to be weighed; a first lower collecting chute which is disposed below the first intermediate collecting hoppers and configured to collect the objects to be weighed which have been discharged from all of the first intermediate collecting hoppers and to discharge the objects to be weighed from a discharge outlet at a bottom part thereof to a first packaging machine inlet; and a second lower collecting chute which is disposed below the second intermediate collecting hoppers and configured to collect the objects to be weighed which have been discharged from all of the second intermediate collecting hoppers and to discharge the objects to be weighed from a discharge outlet at a bottom part thereof to a second packaging machine inlet. The control means may be configured to cause all of the upper collecting hoppers to discharge the objects to be weighed alternately in the first and second directions, when repetitively performing the second discharge process.

In accordance with such a configuration, it is possible to discharge the objects to be weighed to the first and second packaging machine inlets alternately. In addition, the same advantage as that of the three-stage chute configuration is achieved.

The collecting and discharge means may include plural intermediate collecting chutes which are disposed below the upper collecting hoppers and configured to collect the objects to be weighed which have been discharged from plural different upper collecting hoppers and to discharge the objects to be weighed from discharge outlets at bottom parts thereof, plural intermediate collecting hoppers which are respectively provided at the discharge outlets of the intermediate collecting chutes and configured to hold the objects to be weighed which have been discharged from the discharge outlets of the intermediate collecting chutes and to then discharge the objects to be weighed selectively in a first direction or in a second direction; a first lower collecting chute which is disposed below the intermediate collecting hoppers and configured to collect the objects to be weighed which have been discharged from all of the intermediate collecting hoppers in the first direction and to discharge the objects to be weighed from a discharge outlet at a bottom part thereof to a first packaging machine inlet; a second lower collecting chute which is disposed below the intermediate collecting hoppers and configured to collect the objects to be weighed which have been discharged from all of the intermediate collecting hoppers in the second direction and to discharge the objects to be weighed from a discharge outlet at a bottom part thereof to a second packaging machine inlet. The control means may be configured to cause all of the intermediate collecting hoppers to discharge the objects to be weighed alternately in the first and second directions, when repetitively performing the second discharge process.

In accordance with such a configuration, it is possible to discharge the objects to be weighed to the first and second packaging machine inlets alternately. In addition, the same advantage as that of the three-stage chute configuration is achieved.

The collecting and discharge means may further include two lower collecting hoppers which are provided at discharge outlets of the first and second lower collecting chutes, respectively, and configured to hold the objects to be weighed which have been discharged from the discharge outlets of the lower collecting chutes and to then discharge the objects to be weighed.

In accordance with such a configuration, the objects to be weighed which have been discharged onto the first and second lower collecting chutes and have a certain batch length (length) can be collected into and held in the associated lower collecting hoppers, and can be discharged in a lump state from the lower collecting hoppers to the packaging machine inlets.

The upper collecting hopper may be configured to discharge the objects to be weighed selectively in a first direction or in a second direction. The collecting and discharge means may further include collecting chutes in plural stages from second stage to p-th (p: integer of 4 or more) stage which are disposed below a first-stage collecting chute consisting of the upper collecting chutes, and collecting hoppers which are respectively provided at discharge outlets at bottom parts of the collecting chutes in the second stage to (p−1)-th stage, and configured to hold the objects to be weighed which have been discharged from the discharge outlets at the bottom parts of the respective collecting chutes and to then discharge the objects to be weighed, the collecting chute in q-th (q: integer in a range from 2 to p) stage is configured to collect the objects to be weighed which have been discharged from the collecting hoppers provided at the discharge outlets of plural collecting chutes in (q−1)-th stage and to discharge the objects to be weighed from a discharge outlet at a bottom part thereof, the collecting chutes in second stage to p-th stage are disposed so as to form a first discharge path for guiding the objects to be weighed which have been discharged from the upper collecting hopper in the first direction to a first packaging machine inlet and a second discharge path for guiding the objects to be weighed which have been discharged from the upper collecting hopper in the second direction to a second packaging machine inlet. The control means may be configured to cause all of the upper collecting hoppers to discharge the objects to be weighed alternately in the first and second directions when repetitively performing the second discharge process.

In accordance with such a configuration, it is possible to discharge the objects to be weighed to the first and second packaging machine inlets alternately. In addition, the same advantage as that of the multi-stage chute configuration is achieved.

The collecting and discharge means may further include collecting chutes in plural stages from second stage to p-th (p: integer of 4 or more) stage which are disposed below a first-stage collecting chute consisting of the upper collecting chutes, and collecting hoppers which are respectively provided at discharge outlets of bottom parts of the collecting chutes in the second stage to (p−1)-th stage, and configured to hold the objects to be weighed which have been discharged from the discharge outlets at the bottom parts of the respective collecting chutes, and to then discharge the objects to be weighed, the collecting chute in q-th (q: integer in a range from 2 to p) stage, among the collecting chutes in the plural stages, is configured to collect the objects to be weighed which have been discharged from the collecting hoppers respectively provided at discharge outlets of plural collecting chutes in (q−1)-th stage and to discharge the objects to be weighed from a discharge outlet at a bottom part thereof, k-th stage collecting hopper which is a collecting hopper provided at a discharge outlet of the collecting chute in k-th (k: one integer in a range from 2 to p−1) stage is configured to discharge the objects to be weighed selectively in the first direction or in the second direction, the collecting chutes in (k+1)-th stage to p-th stage are disposed so as to form a first discharge path for guiding the objects to be weighed which have been discharged from the k-th stage collecting hopper in the first direction to a first packaging machine inlet and a second discharge path for guiding the objects to be weighed which have been discharged from the k-th stage collecting hopper in the second direction to a second packaging machine inlet. The control means may be configured to cause all of the collecting hoppers in k-th stage to discharge the objects to be weighed alternately in the first and second directions when repetitively performing the second discharge process.

In accordance with such a configuration, it is possible to discharge the objects to be weighed to the first and second packaging machine inlets alternately. In addition, the same advantage as that of the multi-stage chute configuration is achieved.

The collecting and discharge means may include a collecting hopper which is provided at a discharge outlet of the collecting chute in p-th stage and configured to hold the objects to be weighed which have been discharged from the discharge outlet of the collecting chute in p-th stage and to then discharge the objects to be weighed.

In accordance with such a configuration, it is possible to discharge the objects to be weighed in a lump state from the collecting hopper provided at the discharge outlet of the collecting chute in p-th stage to the packaging machine inlet.

The control means may be configured to repetitively perform the combination process in such a manner that, in n (n: predetermined plural number) successive combination processes, the combination calculation is performed based on weights of objects to be weighed which are held in combination hoppers which are not selected to make up a discharge combination determined in previous combination processes, in a next and earliest combination process.

In accordance with such a configuration, since the combination process can be performed n times and the objects to be weighed can be discharged n times within the actual weighing cycle time, productivity within a certain time period can be improved. In the case of n=2, so-called a double shift operation takes place, while in the case of n=3, so-called a triple shift operation takes place.

The control means may be configured to determine the discharge combination such that the discharge combination includes the combination hoppers belonging to at least two combination hopper groups.

In accordance with such a configuration, since the objects to be weighed which have been discharged from the combination hoppers making up the discharge combination are discharged to at least two upper collecting chutes and collected into at least two upper collecting hoppers separately, the size (volume) of the upper collecting hopper can be reduced.

The control means may be configured to repetitively perform a series of processes including the combination process, the first discharge process and the second discharge process, in a predetermined cycle, and the upper collecting chute may be configured such that a time period that elapses from when the combination hoppers making up the discharge combination determined in the combination process start discharging of the objects to be weighed until all of the discharged objects to be weighed pass through on the upper collecting chute and are fed to the upper collecting hopper is not longer than 1.1 times as long as the predetermined cycle.

In accordance with such a configuration, it is possible to suppress the batch time of the objects to be weighed on the upper collecting chute to a certain time or less. The objects to be weighed are discharged from the combination hoppers selected to make up the discharge combination in every predetermined cycle. After all of the objects to be weighed which have been discharged from the combination hoppers selected to make up a certain discharge combination slide down on the upper collecting chute, the objects to be weighed are discharged from the combination hoppers selected to make up a next discharge combination. This makes it possible to surely prevent mixing between a previous batch of objects to be weighed and a next batch of objects to be weighed on the upper collecting chute and to discharge the objects to be weighed from the upper collecting hopper in every predetermine cycle.

In aforesaid two-stage chute configuration, the control means may be configured to repetitively perform a series of processes including the combination process, the first discharge process and the second discharge process, in a predetermined cycle, and the upper collecting chute may be configured such that a time period that elapses from when the combination hoppers making up the discharge combination determined in the combination process start discharging of the objects to be weighed until all of the discharged objects to be weighed pass through on the upper collecting chute and are fed to the upper collecting hopper is not longer than 1.1 times as long as the predetermined cycle, and the lower collecting chute may be configured such that a time period that elapses from when the upper collecting hopper starts discharging of the objects to be weighed until all of the discharged objects to be weighed pass through on the lower collecting chute and are discharged from a discharge outlet at a bottom part of the lower collecting chute is not longer than 1.1 times as long as the predetermined cycle.

In accordance with such a configuration, it is possible to suppress the batch time of the objects to be weighed on the upper and lower collecting chutes to a certain time or less. The objects to be weighed are discharged from the combination hoppers selected to make up the discharge combination in every predetermined cycle. After all of the objects to be weighed which have been discharged from the combination hoppers selected to make up a certain combination slide down on the upper collecting chute, the objects to be weighed are discharged from the combination hoppers selected to make up a next discharge combination. This makes it possible to surely prevent mixing between a previous batch of objects to be weighed and a next batch of objects to be weighed on the upper collecting chute and to discharge the objects to be weighed from the upper collecting hopper in every predetermine cycle. In addition, after all of the objects to be weighed which have been discharged from the upper collecting hopper slide down on the lower collecting chute, a next batch of the objects to be weighed are discharged from the upper collecting hopper. This makes it possible to surely prevent mixing between a previous batch of objects to be weighed and a next batch of objects to be weighed on the lower collecting chute and to discharge the objects to be weighed from the discharge outlet of the lower collecting chute in every predetermine cycle.

In aforesaid three-stage chute configuration, the control means may be configured to repetitively perform a series of processes including the combination process, the first discharge process and the second discharge process, in a predetermined cycle, and the upper collecting chute may be configured such that a time period that elapses from when the combination hoppers making up the discharge combination determined in the combination process start discharging of the objects to be weighed until all of the discharged objects to be weighed pass through on the upper collecting chute and are fed to the upper collecting hopper is not longer than 1.1 times as long as the predetermined cycle, the intermediate collecting chute may be configured such that a time period that elapses from when the upper collecting hopper starts discharging the objects to be weighed until all of the discharged objects to be weighed pass through on the intermediate collecting chute and are fed to the intermediate collecting hopper is not longer than 1.1 times as long as the predetermined cycle, and the lower collecting chute may be configured such that a time period that elapses from when the intermediate collecting hopper starts discharging of the objects to be weighed until all of the discharged objects to be weighed pass through on the lower collecting chute and are discharged from a discharge outlet at a bottom part of the lower collecting chute is not longer than 1.1 times as long as the predetermined cycle.

In accordance with such a configuration, it is possible to suppress the batch time of the objects to be weighed on the upper, intermediate and lower collecting chutes to a certain time or less. The objects to be weighed are discharged from the combination hoppers selected to make up the discharge combination in every predetermined cycle. After all of the objects to be weighed which have been discharged from the combination hoppers selected to make up a certain discharge combination slide down on the upper collecting chute, the objects to be weighed are discharged from the combination hoppers selected to make up a next discharge combination. This makes it possible to surely prevent mixing between a previous batch of objects to be weighed and a next batch of objects to be weighed on the upper collecting chute and to discharge the objects to be weighed from the upper collecting hopper in every predetermine cycle. In addition, after all of the objects to be weighed which have been discharged from the upper collecting hopper slide down on the intermediate collecting chute, a next batch of the objects to be weighed are discharged from the upper collecting hopper. This makes it possible to surely prevent mixing between a previous batch of objects to be weighed and a next batch of objects to be weighed on the intermediate collecting chute and to discharge the objects to be weighed from the intermediate collecting hopper in every predetermine cycle. In addition, after all of the objects to be weighed which have been discharged from the intermediate collecting hopper slide down on the lower collecting chute, a next batch of the objects to be weighed are discharged from the intermediate collecting hopper. This makes it possible to surely prevent mixing between a previous batch of objects to be weighed and a next batch of objects to be weighed on the lower collecting chute and to discharge the objects to be weighed from the discharge outlet of the lower collecting chute in every predetermine cycle.

In aforesaid triple-stage chute configuration, the control means may be configured to repetitively perform a series of processes including the combination process, the first discharge process and the second discharge process, in a predetermined cycle, and the first-stage collecting chute may be configured such that a time period that elapses from when the combination hoppers making up the discharge combination determined in the combination process start discharging of the objects to be weighed until all of the discharged objects to be weighed pass through on the first-stage collecting chute and are fed to the upper collecting hopper is not longer than 1.1 times as long as the predetermined cycle, the collecting chute in q-th stage may be configured such that a time period that elapses from when the collecting hopper provided at the discharge outlet of the collecting chute in (q−1)-th stage starts discharging of the objects to be weighed until all of the discharged objects to be weighed pass through on the collecting chute in q-th stage and are discharged from a discharge outlet at a bottom part of the collecting chute in q-th stage is not longer than 1.1 times as long as the predetermined cycle.

In accordance with such a configuration, it is possible to suppress the batch time of the objects to be weighed on the collecting chutes in first stage (upper) to p-th stage to a certain time or less. The objects to be weighed are discharged from the combination hoppers selected to make up the discharge combination in every predetermined cycle. After all of the objects to be weighed which have been discharged from the combination hoppers selected to make up a discharge combination slide down on the first-stage (upper) collecting chute, the objects to be weighed are discharged from the combination hoppers selected to make up a next discharge combination. This makes it possible to surely prevent mixing between a previous batch of objects to be weighed and a next batch of objects to be weighed on the first-stage (upper) collecting chute and to discharge the objects to be weighed from the upper collecting hopper in every predetermine cycle. In addition, after all of the objects to be weighed which have been discharged from the collecting hopper provided at the discharge outlet of the collecting chute in (q−1)-th stage slide down on the collecting chute in q-th stage, a next batch of the objects to be weighed are discharged from the above mentioned collecting hopper. This makes it possible to surely prevent mixing between a previous batch of objects to be weighed and a next batch of objects to be weighed on the collecting chute in q-th stage and to discharge the objects to be weighed from the discharge outlet of the collecting chute in q-th stage in every predetermine cycle.

In aforesaid two-direction discharge configuration, the control means may be configured to repetitively perform a series of processes including the combination process, the first discharge process and the second discharge process, in a predetermined cycle, and the upper collecting chute may be configured such that a time period that elapses from when the combination hoppers making up the discharge combination determined in the combination process start discharging of the objects to be weighed until all of the discharged objects to be weighed pass through on the upper collecting chute and are fed to the upper collecting hopper is not longer than 1.1 times as long as the predetermined cycle, the first lower collecting chute may be configured such that a time period that elapses from when the upper collecting hopper starts discharging of the objects to be weighed in the first direction until all of the discharged objects to be weighed pass through on the first lower collecting chute and are discharged from a discharge outlet at a bottom part of the first lower collecting chute is not longer than (2×1.1) times as long as the predetermined cycle, and the second lower collecting chute may be configured such that a time period that elapses from when the upper collecting hopper starts discharging of the objects to be weighed in the second direction until all of the discharged objects to be weighed pass through on the second lower collecting chute and are discharged from a discharge outlet at a bottom part of the second lower collecting chute is not longer than (2×1.1) times as long as the predetermined cycle.

In accordance with such a configuration, it is possible to suppress the batch time of the objects to be weighed on the upper and lower collecting chutes to a certain time or less. The objects to be weighed are discharged from the combination hoppers selected to make up the discharge combination in every predetermined cycle. After all of the objects to be weighed which have been discharged from the combination hoppers selected to make up a discharge combination slide down on the upper collecting chute, the objects to be weighed are discharged from the combination hoppers selected to make up a next discharge combination. This makes it possible to surely prevent mixing between a previous batch of objects to be weighed and a next batch of objects to be weighed on the upper collecting chute and to discharge the objects to be weighed from the upper collecting hopper alternately to the first lower collecting chute and to the second lower collecting chute in every predetermine cycle. Therefore, the objects to be weighed are discharged from the upper collecting hopper to the first lower collecting chute and to the second lower collecting chute once every time which is twice as long as the predetermined cycle. After all of the objects to be weighed of a previous batch which have been discharged from the upper collecting hopper slide down on each of the first and second lower collecting chutes, a next batch of the objects to be weighed are discharged from the upper collecting hopper to the same. This makes it possible to surely prevent mixing between a previous batch of objects to be weighed and a next batch of objects to be weighed on the first and second lower collecting chutes and to discharge the objects to be weighed from the discharge outlets of the first and second lower collecting chutes every time which is twice as long as the predetermined cycle.

The predetermined cycle may be set to a time which is 1/k (k: 1 or plural number) of an actual weighing cycle time which is a time period from when the combination hoppers making up the discharge combination determined in the combination process start discharging of the objects to be weighed until a time just before a procedure in which the combination hoppers making up the discharge combination are next fed with the objects to be weighed, then a next and earliest combination process is performed using at least weights of the objects to be weighed held in the combination hoppers making up the discharge combination, and combination hoppers making up a discharge combination determined in the next and earliest combination process start discharging of the objects to be weighed.

For example, the configuration in the case of k=1 is a configuration for causing the combination weigher to perform so-called a single shift operation, the configuration in the case of k=2 is a configuration for causing the combination weigher to perform so-called a double shift operation, and the configuration in the case of k=3 is a configuration for causing the combination weigher to perform so-called a triple shift operation.

The actual weighing cycle time may be equal to an ideal weighing cycle time which is a time period from when the combination hoppers making up the discharge combination determined in the combination process start discharging of the objects to be weighed until the combination hoppers making up the discharge combination are next fed with the objects to be weighed, then a next and earliest combination process is performed using at least weights of the objects to be weighed held in the combination hoppers making up the discharge combination, and a discharge combination is determined in the next and earliest combination process.

In accordance with such a configuration, the combination weigher is able to exhibit a highest weighing capability (speed).

It is preferable that when the number of the weighing units is x, the total number of the combination hoppers included in all of the weighing units is y, and y/x is an integer, the combination hopper group in each of the weighing units may be configured to consist of y/x combination hoppers, and when $(z-1)<(y/x)<z$ (z: integer) is satisfied, the combination hopper group in a part of all of the weighing units may be configured to consist of z combination hoppers and the combination hopper group in the weighing unit other than the part of the all of the weighing units may be configured to consist of (z−1) combination hoppers.

In accordance with such a configuration, when the combination hopper group in each weighing unit includes y/x combination hoppers, it is possible to equalize the sizes of the upper collecting chutes in the respective weighing units, the transportation distances and transportation time periods of the objects to be weighed sliding down on the respective upper collecting chutes. When the combination hopper group in a part of all of the weighing units includes z combination hoppers and the combination hopper group in other weighing unit includes (z−1) combination hoppers, it is possible to equalize the transportation distances and transportation time periods of the objects to be weighed sliding down on the respective upper collecting chutes by setting the size of the upper collecting chute in other weighing unit equal to the size of the upper collecting chute in the part of all of the weighing units and by arranging the combination hoppers with respect to the upper collecting chute in other weighing unit in the same manner that the combination hoppers are arranged with respect to the upper collecting chute in the part of all of the weighing units.

The respective upper collecting chutes may be arranged without a gap between them.

In accordance with such a configuration, it is possible to minimize the installation area of the combination weigher. In addition, it is possible to reduce the size of the collecting and discharge means for collecting the objects to be weighed which are discharged from the upper collecting hopper, for example, the size of the lower collecting chute in the two-stage chute configuration, the intermediate collecting chute in the three-stage chute configuration, etc. This contributes to reduction of the transportation distance and transportation time period of the objects to be weighed sliding down on these collecting chutes.

The respective upper collecting chutes may be arranged with a gap between them.

In accordance with such a configuration, it is possible to reduce the installation area of the combination weigher by arranging the upper collecting chutes adjacent each other. In addition, it is possible to reduce the size of the collecting and discharge means for collecting the objects to be weighed which are discharged from the upper collecting hopper, for example, the size of the lower collecting chute in the two-stage chute configuration, the intermediate collecting chute in the three-stage chute configuration, etc. This contributes to reduction of the transportation distance and transportation time period of the objects to be weighed sliding down on these collecting chutes. Furthermore, by providing a small gap between the upper collecting chutes, work such as cleaning is facilitated.

The imaginary circles may be configured to be in contact with each other.

In accordance with such a configuration, it is possible to reduce the installation area of the combination weigher. In addition, it is possible to reduce the size of the collecting and discharge means for collecting the objects to be weighed which are discharged from the upper collecting hopper, for example, the size of the lower collecting chute in the two-stage chute configuration, the intermediate collecting chute in the three-stage chute configuration, etc. This contributes to reduction of the transportation distance and transportation time period of the objects to be weighed sliding down on these collecting chutes.

The same kinds of objects to be weighed may be fed to the combination hoppers in all of the weighing units.

Effects of the Invention

The present invention has the above described configuration and achieves an advantage that the combination weigher can reduce the batch time of the objects to be weighed on the collecting chutes and perform a high-speed operation regardless of a characteristic of the objects to be weighed, etc.

The above object, other objects, features, and advantages of the present invention will be apparent by the following detailed description of preferred Embodiment of the inventions, with reference to the accompanying drawings.

BRIEF DESCRIPTION OF THE DRAWINGS

FIG. 1(b) is a schematic view of upper collecting chutes and weighing hoppers of the combination weigher, as viewed from above.

FIG. 8(b) is a schematic view of upper, intermediate and lower collecting chutes of the combination weigher, as viewed from the front.

Figure 1:
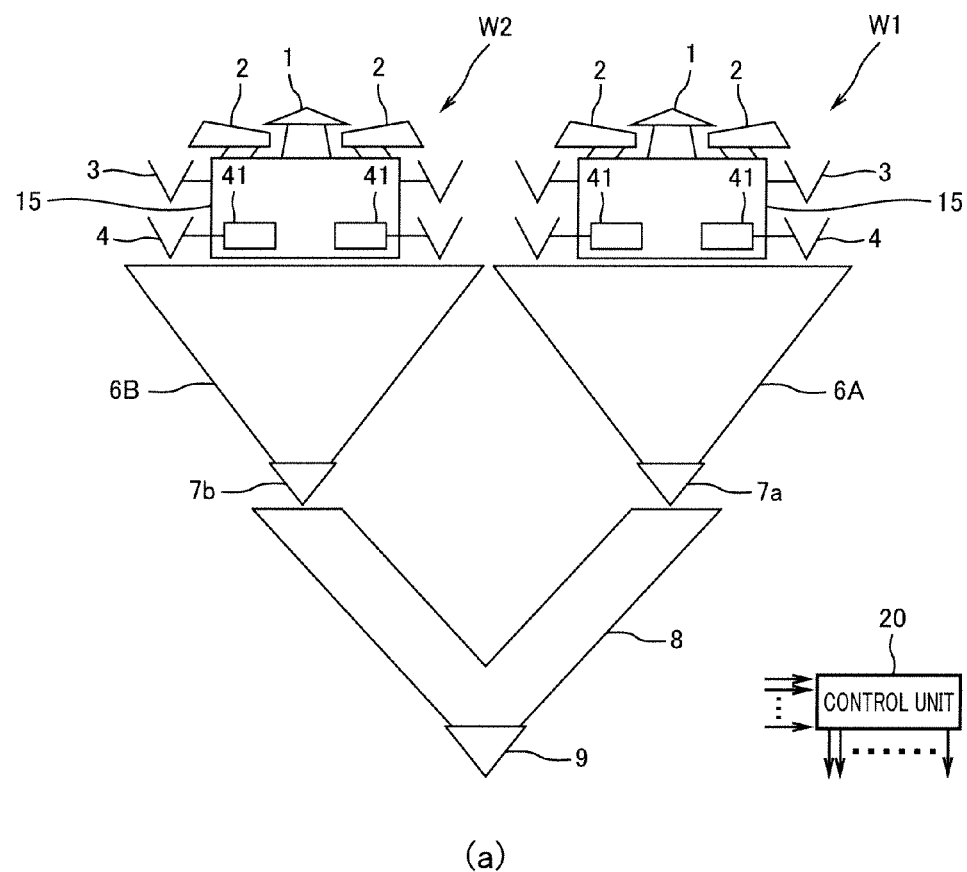
FIG. 1 (a) is a schematic partial cross-sectional view of a combination weigher according Embodiment 1 of the present invention, as viewed from the front.
Figure 1:
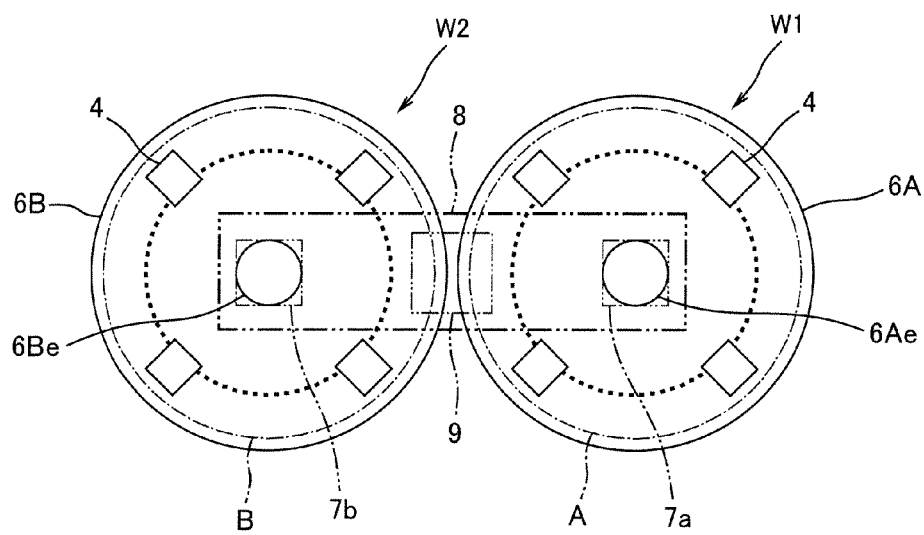

EXPLANATION OF REFERENCE NUMERALS 1. dispersion feeder
2. linear feeder
3. feeding hopper
4. weighing hopper
5. memory hopper
6A~6D. upper collecting chutes
7a~7d. upper collecting hoppers
8. lower collecting chute
9. lower collecting hopper
10a, 10b intermediate collecting chutes
11a, 11b intermediate collecting hoppers
20. control unit

BEST MODE FOR CARRYING OUT EMBODIMENT

Hereinafter, preferred embodiments of the present invention will be described with reference to the drawings.

Embodiment 1

FIG. 1 (a) is a schematic partial cross-sectional view of a combination weigher according to Embodiment 1 of the present invention, as viewed from the front, and FIG. 1(b) is a schematic view of upper collecting chutes and weighing hoppers of the combination weigher, as viewed from above.

The combination weigher includes two weighing units W1, W2, a lower collecting chute 8 disposed below the weighing units, a lower collecting hopper 9 provided at a discharge outlet of a bottom part of the lower collecting chute 8, and a control unit 20.

The two weighing units W1, W2 have the same configuration. Each of the weighing units W1, W2 is constructed in such a manner that a center base body (body) 15 is disposed at a center of the weighing unit and supported by four legs (not shown), and a dispersion feeder 1 having a conical shape is mounted to the upper part of the center base body (body) 15 to radially disperse objects to be weighed supplied from an external supplying device by vibration. Around the dispersion feeder 1, plural linear feeders 2 are provided to transfer the objects to be weighed which have been delivered from the dispersion feeder 1 into respective feeding hoppers 3 by vibration. Plural feeding hoppers 3 and plural weighing hoppers 4 are disposed below the linear feeders 2 and are arranged in a circular form in such a manner that each feeding hopper 3 and each weighing hopper 4 correspond to the associated one of the linear feeders 2. The plural feeding hoppers 3 and the plural weighing hoppers 4 are arranged circularly around the center base body 15. The dispersion feeder 1, the linear feeders 2, the feeding hoppers 3 and the weighing hoppers 4 are mounted to the center base body 15. Driving units (vibration devices for the dispersion feeder 1 and the linear feeders 2, gate opening and closing devices for the feeding hoppers 3 and the weighing hoppers 4, etc) are accommodated within the center base body 15. Each weighing hopper 4 is attached with a weight sensor 41 such as a load cell for measuring the weight of the objects to be weighed inside the weighing hopper 4. The weight sensor 41 is accommodated along with the driving unit within the center base body 15. Each weight sensor 41 outputs the measured value to the control unit 20.

In the weighing units W1, W2, the upper collecting chutes 6A, 6B having circular upper openings and a substantially inverted truncated cone shape are disposed below the weighing hoppers 4 arranged circularly, respectively. Upper collecting hoppers 7a, 7b are provided at discharge outlets 6Ae, 6Be of the bottom parts of the upper collecting chutes 6A, 6B, respectively. A group A is defined as a group of the weighing hoppers 4 belonging to the weighing unit W1. The objects to be weighed which have been discharged from the weighing hoppers 4 in the group A slide down on the upper collecting chute 6A, are held in the upper collecting hopper 7a and thereafter are discharged therefrom. Likewise, a group B is defined as a group of the weighing hoppers 4 belonging to the weighing unit W2. The objects to be weighed which have been discharged from the weighing hoppers 4 in the group B slide down on the upper collecting chute 6B, are held in the upper collecting hopper 7b and thereafter are discharged therefrom.

As described above, each of the weighing units W1, W2 includes the dispersion feeder 1, the plural linear feeders 2, the plural feeding hoppers 3, the plural weighing hoppers 4 and weight sensors 41, the upper collecting chute (6A, 6B), the upper collecting hopper (7a, 7b), and the center base body 15. The same kinds of objects to be weighed are supplied to the dispersion feeders 1 of the weighing units W1, W2, and the same kinds of objects to be weighed are fed to all of the weighing hoppers 4 included in the combination weigher.

A single lower collecting chute 8 is disposed below the upper collecting hoppers 7a, 7b of the two weighing units W1, W2, and the lower collecting hopper 9 is disposed at the discharge outlet of the bottom part of the lower collecting chute 8.

Figure 14:
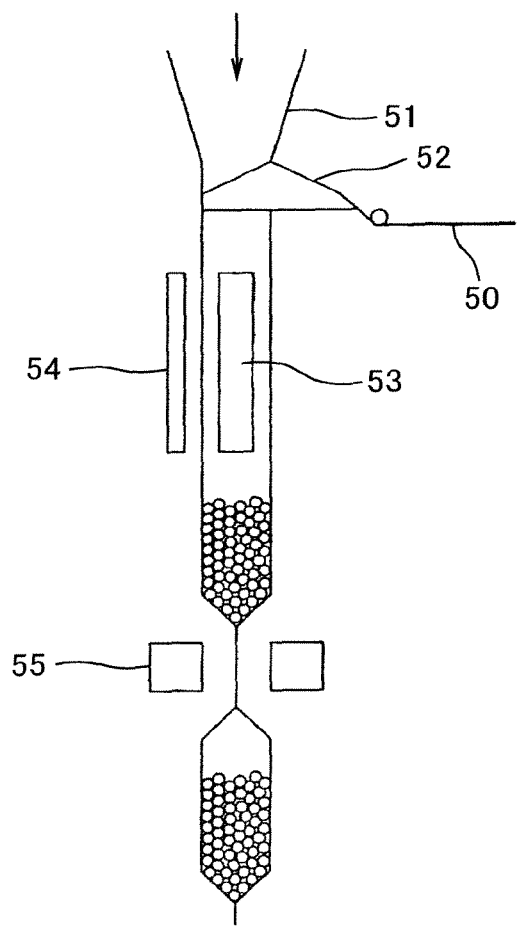
FIG. 14 is a schematic view showing an exemplary packaging machine disposed below the combination weigher.

Below the lower collecting chute 8 of the combination weigher, for example, a packaging machine (e.g., longitudinal pillow packaging machine) having a single inlet as shown in FIG. 14 is disposed. The objects to be weighed which have been discharged from the lower collecting hopper 9 are fed into the inlet (upper opening of a tube 51) of the packaging machine.

FIG. 14 is a schematic view showing an exemplary packaging machine (longitudinal pillow packaging machine) disposed below the combination weigher.

While manufacturing package bags, the packaging machine charges into the package bags the objects to be weighed which have been discharged from the combination weigher and packages them. In this packaging machine, a sheet of wrapping material 50 pulled out from a roll of a wrapping material is caused to wind a tube 51 by a former 52 to form a cylindrical shape, is suctioned by a pull-down belt unit 53 to be delivered downwardly, and the joined vertical edges of the cylindrical wrapping material 50 are sealed (by fusion adhesion) by a vertical sealing machine 54. Then, the objects to be weighed which have been weighed are charged into the cylindrical wrapping material 50 through the tube 51, and a horizontal sealing machine 55 positioned below the tube 51 seals horizontally across the upper end of a preceding bag and the lower end of the following bag. This horizontal sealing enables the preceding bag to be formed into a complete one with its upper and lower ends sealed, because the lower end of the preceding bag has been sealed by the previous horizontal sealing.

As should be appreciated from the above, in this Embodiment, the combination weigher is configured such that the objects to be weighed which have been discharged from both of the collecting hoppers 7a, 7b are held in the lower collecting hopper 9 and thereafter are fed into a single packaging machine inlet.

The control unit 20 controls the operation of the entire combination weigher and performs a combination process to determine a combination (discharge combination) made up of the weighing hoppers 4 which should discharge the objects to be weighed, from among the weighing hoppers 4 in the groups A, B of the weighing units W1, W2. In the combination process, the combination calculation is performed based on measured values (measured values of the weights of the objects to be weighed inside the weighing hoppers 4, which are obtained using the weight sensors 41) of the weighing hoppers 4 holding the objects to be weighed whose weights have been weighed by the weight sensors 41 to determine one combination made up of the weighing hoppers 4 in which a combination weight value which is a total of the measured values falls within an allowable range (predetermined weight range) with respect to a target weight value and the combination is determined as a discharge combination. If combinations in which the combination weight values fall within the allowable range with respect to the target weight value are plural in number, then a combination in which, for example, a total of the measured values is closest to the target weight value (or a combination whose measured value coincides with the target weight value, if any), i.e., a combination in which an absolute value of a difference between the total of the measured values and the target weight value is smallest, is determined as a discharge combination. In the combination weigher, the target weight value and an allowable range of the target weight value are preset.

The outline of the operation of the combination weigher configured as described above will be described.

An external supplying device supplies the objects to be weighed to each dispersion feeder 1. The dispersion feeder 1 feeds the objects to be weighed to the feeding hopper 3 via the linear feeder 2. The feeding hopper 3 feeds the objects to be weighed to the weighing hopper 4. The weight sensor 41 measures the weight of the objects to be weighed held in the weighing hopper 4 and outputs the measured value to the control unit 20. Then, the above mentioned combination process is performed to determine the discharge combination. Then, the weighing hoppers 4 selected to make up the discharge combination discharge the objects to be weighed and the feeding hoppers 3 feed the objects to be weighed to the weighing hoppers 4 which are empty. The linear feeders 2 feed the objects to be weighed to the feeding hoppers 3 which are empty. The objects to be weighed which have been discharged from the weighing hoppers 4 slide down on the upper collecting chutes 6A, 6B, are held in the upper collecting hoppers 7a, 7b and thereafter are discharged from the upper collecting hoppers 7a, 7b. The objects to be weighed slide down on the lower collecting chute 8, are held in the lower collecting hopper 9, and thereafter are discharged to the packaging machine.

Subsequently, the operations in the case where discharge cycle times of the combination weigher are made different will be described. The term "discharge cycle time" as used herein refers to a discharge cycle in which the objects to be weighed are discharged from the weighing hoppers 4 selected to make up the discharge combination. The operation in which the discharge cycle time is equal to an actual weighing cycle time is named a single shift operation. The operation in which the discharge cycle time is ½ of an actual weighing cycle time is named a double shift operation. The operation in which the discharge cycle time is ⅓ of an actual weighing cycle time is named a triple shift operation.

Figure 2:
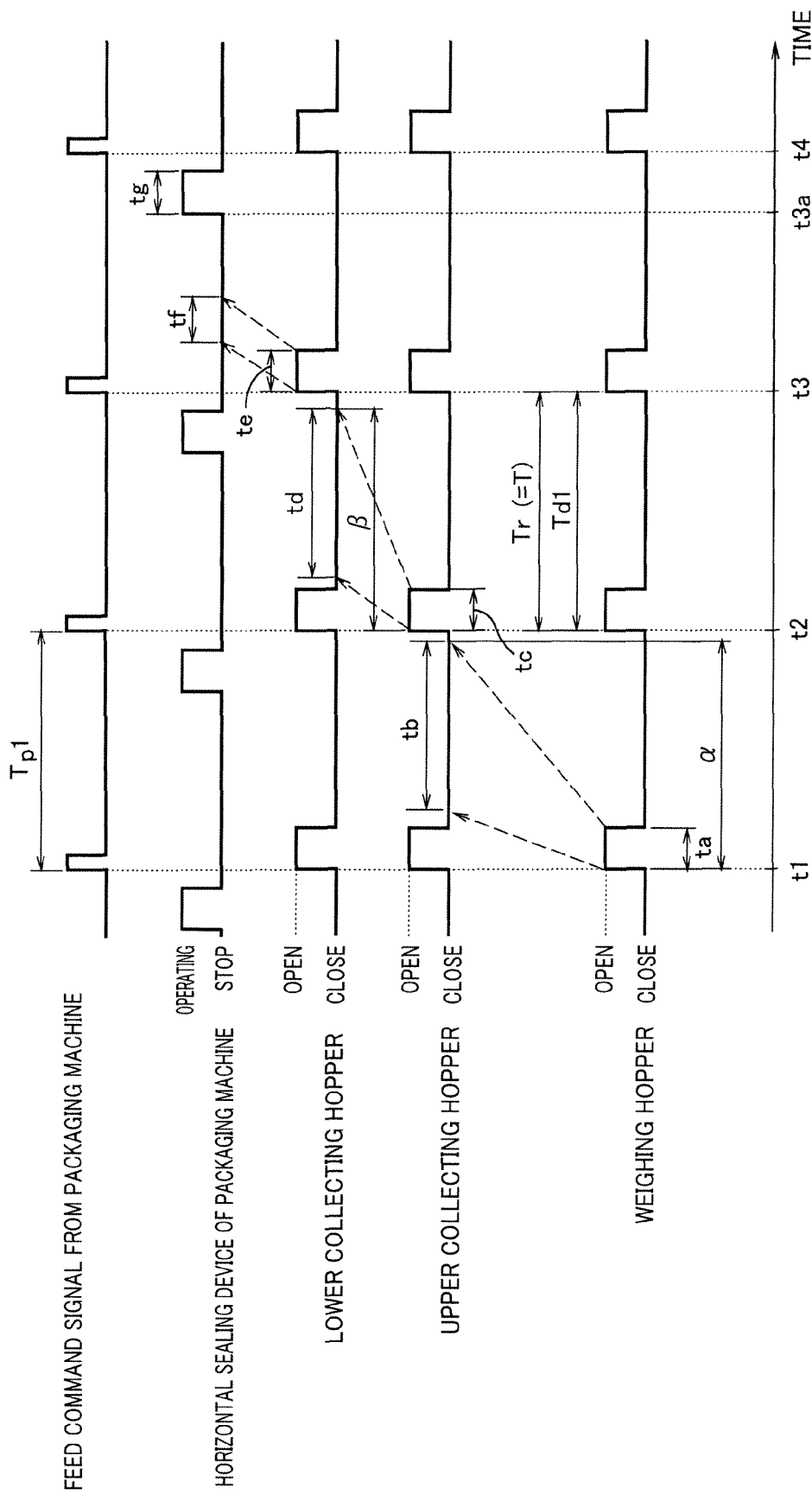
FIG. 2 is a timing chart showing an example of the opening and closing operation of the gates of collecting hoppers, the opening and closing operation of the gates of the weighing hoppers, and the operation of a horizontal sealing device of a packaging machine, in a case where the combination weigher of Embodiment 1 of the present invention is configured to perform a single shift operation.

FIG. 2 is a timing chart showing an example of the opening and closing operation of the gates of collecting hoppers, the opening and closing operation of the gates of the weighing hoppers, and the operation of the horizontal sealing device of the packaging machine, in a case where the combination weigher of this Embodiment is configured to perform a single shift operation.

The actual weighing cycle time Tr is, for example, a time period which lapses immediately after a discharge combination is determined in a combination process performed in a previous weighing cycle, weighing hoppers 4 selected to make up the discharge combination discharge the objects to be weighed, the objects to be weighed are next fed to these weighing hoppers 4 belonging to the discharge combination, time for stabilizing the associated weight sensors 41 lapses, these weight sensors 41 measure the weights of the objects to be weighed, a next and earliest combination process is performed using at least the measured values of these weighing hoppers 4, and then a discharge combination is determined. It is supposed that a weighing cycle time in a case where an allowance time, a wait time, etc, which elapses from when a discharge combination is determined in a combination process, until weighing hoppers 4 selected to make up the discharge combination start discharging of the objects to be weighed are zero is an ideal weighing cycle time T. Therefore, the ideal weighing cycle time T is, for example, a time period taken to accomplish a procedure in which, weighing hoppers 4 selected to make up the discharge combination determined in the combination process in the previous weighing cycle start discharging of the objects to be weighed, the objects to be weighed are next fed to these weighing hoppers 4 belonging to the discharge combination, time for stabilizing the associated weight sensors 41 lapses, these weight sensors 41 measure the weights of the objects to be weighed, a next and earliest combination process is performed using at least the measured values of these weighing hoppers 4, and a discharge combination is determined. The ideal weighing cycle time is a time determined uniquely depending on the characteristic of the objects to be weighed, etc.

FIG. 2 shows an example in which the actual weighing cycle time Tr is equal to the ideal weighing cycle time T, that is, the combination weigher is operated at a maximum speed, and discharge cycle time Td1 associated with the weighing hopper 4 is equal to the actual weighing cycle time Tr (=T) and is equal to a packaging cycle time Tp1.

In the configuration for causing the combination weigher to perform the single shift operation, favorable weighing accuracy is achieved, for example, by setting the number of the weighing hoppers 4 in each of the groups A and B to five so that the total number of weighing hoppers 4 is ten, and by setting the number of weighing hoppers 4 which would be selected in the combination process (number of the weighing hoppers 4 which would be selected to make up the discharge combination) to four. The phrase "setting the number of weighing hoppers 4 which would be selected in the combination process to four" means that the operation of the linear feeder 2, and others is set so that a target feed amount of the objects to be weighed which are fed once from each feeding hopper 3 to the associated weighing hopper 4 is approximately ¼ of the target weight value.

In the single shift operation, once every actual weighing cycle time Tr (in this example, Tr=T), the combination process is performed, and the weighing hoppers 4 selected to make up the discharge combination in the combination process discharge the objects to be weighed. Therefore, once every time Tr, the combination process is repeated, and the weighing hoppers 4 making up the discharge combination sequentially determined discharge the objects to be weighed to the upper collecting chutes 6A, 6B. Correspondingly, once every time Tr, both of the upper collecting hoppers 7a and 7b discharge the objects to be weighed simultaneously, and the lower collecting hopper 9 discharges the objects to be weighed. Thereby, the objects to be weighed are fed to the packaging machine once every actual weighing cycle time Tr.

Under the state where the combination weigher is operated continuously, the control unit 20 opens the gate of the lower collecting hopper 9 to discharge the objects be weighed to the packaging machine, in response to, for example, a feed command signal received from the packaging machine (time t1, t2, t3, ... ).

In the configuration of FIG. 2, for example, the objects to be weighed which have been discharged from the weighing hopper 4 by opening of the gate at time t1 are collected into the upper collecting hopper 7a, 7b and held therein until time t2, the objects to be weighed which have been discharged from the upper collecting hopper 7a, 7b by opening of the gate of the upper collecting hopper 7a, 7b at time t2 are collected into the lower collecting hopper 9 and held therein until time t3, and discharged to the packaging machine by opening of the gate of the lower collecting hopper 9 at time t3. The objects to be weighed which have been discharged by opening of the gate of the lower collecting hopper 9 at time t3 are fed to the packaging machine before time t3a when the horizontal sealing device 55 of the packaging machine starts the horizontal sealing, and horizontal sealing for sealing a portion corresponding to the upper end of the package bag starts at time t3a.

In the example of FIG. 2, when the weighing hopper 4 opens the gate during a time period ta, the objects to be weighed which have been discharged from the weighing hopper 4 are fed to the upper collecting hopper 7a, 7b during a time period tb. When the upper collecting hopper 7a, 7b opens the gate during a time period tc, the objects to be weighed which have been discharged from the upper collecting hopper 7a, 7b are fed to the lower collecting hopper 9 during a time period td. When the lower collecting hopper 9 opens the gate during a time period te, the objects to be weighed which have been discharged from the upper collecting hopper 9 are fed to the packaging machine during a time period tf. The packaging machine performs an operation in, for example, a fixed packaging cycle (Tp1). In the example of FIG. 2, during a time period tg which is set not to coincide with the time period tf when the objects to be weighed which have been discharged from the combination weigher are fed to the packaging machine, the horizontal sealing device 55 performs horizontal sealing.

By causing the combination weigher to perform the single shift operation as described above, the objects to be weighed are discharged to the packaging machine once every time Tr.

Subsequently, the operation in the case where the combination weigher is configured to perform the double shift operation will be described in detail. In the configuration for causing the combination weigher to perform the double shift operation, for example, the number of the weighing hoppers 4 in each of the groups A and B may be set to seven so that the total number of weighing hoppers 4 is fourteen, and the number of weighing hoppers 4 which would be selected in the combination process may be set to four. In this case, in the combination process performed repetitively, four weighing hoppers 4 are selected from among about ten weighing hoppers 4, and weighing accuracy which is substantially as high as the weighing accuracy obtained in the case where the single shift operation is performed by setting the total number of weighing hoppers 4 to ten and the number of objects to be weighed which would be selected in the combination process to four.

Figure 3:
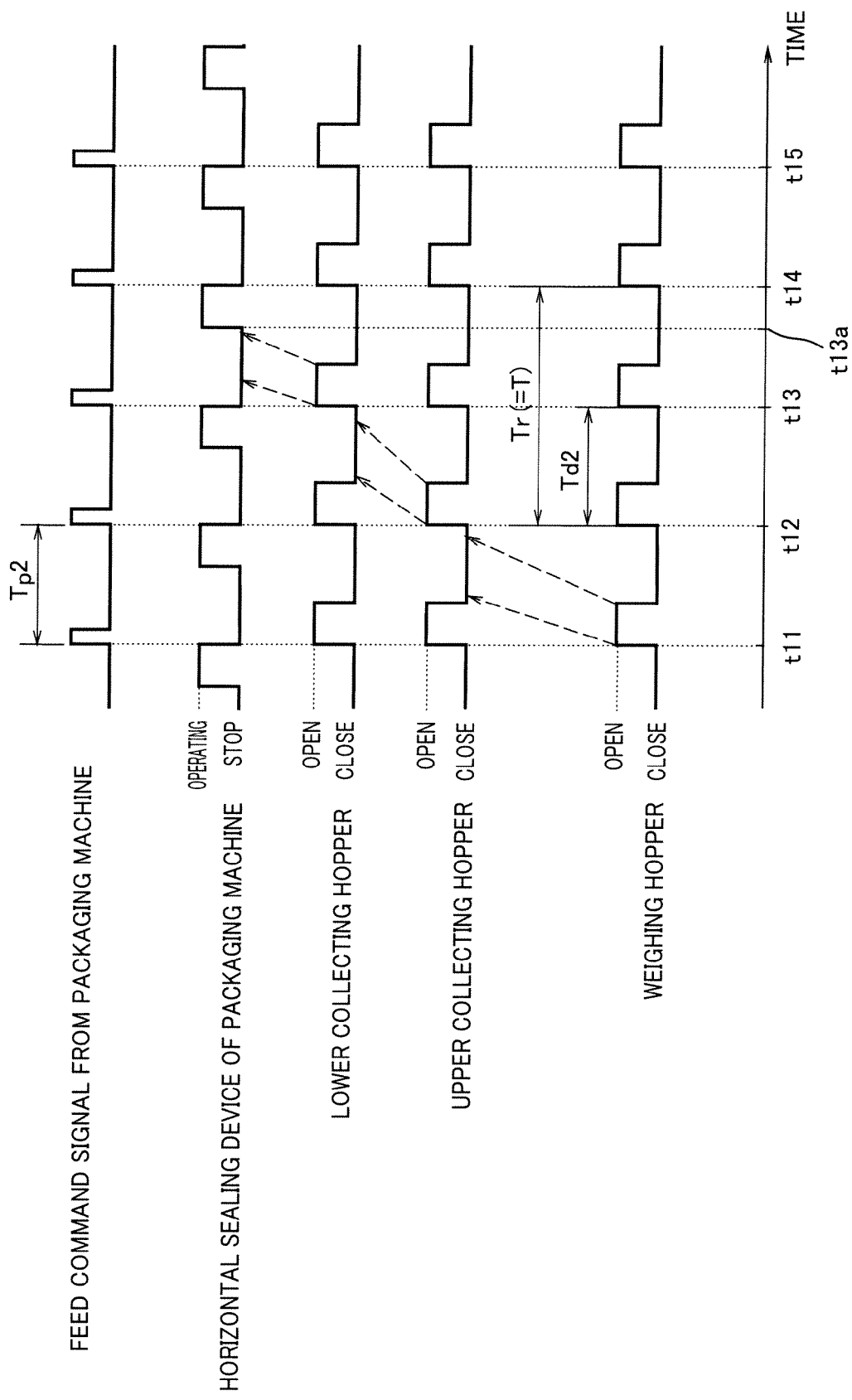
FIG. 3 is a timing chart showing an example of the opening and closing operation of the gates of collecting hoppers, the opening and closing operation of the gates of the weighing hoppers, and the operation of the horizontal sealing device of the packaging machine, in a case where the combination weigher of Embodiment 1 of the present invention is configured to perform a double shift operation.

FIG. 3 is a timing chart showing an example of the opening and closing operation of the gates of collecting hoppers, the opening and closing operation of the gates of the weighing hoppers, and the operation of the horizontal sealing device of the packaging machine, in a case where the combination weigher of this Embodiment of the present invention is configured to perform the double shift operation. As in the example of FIG. 2, FIG. 3 shows an example in which the actual weighing cycle time Tr is equal to the ideal weighing cycle time T, that is, the combination weigher is operated at a maximum speed, and the discharge cycle time Td2 associated with the weighing hopper 4 is equal to ½ of the actual weighing cycle time Tr (=T) and is equal to a packaging cycle time Tp2.

In the double shift operation, once every time Tr/2, the combination process is performed, and the weighing hoppers 4 selected to make up the discharge combination in the combination process discharge the objects to be weighed. Therefore, once every time Tr/2, the combination process is repeated, and the weighing hoppers 4 making up the discharge combination sequentially determined discharge the objects to be weighed to the upper collecting chutes 6A, 6B. Correspondingly, once every time Tr/2, both of the upper collecting hoppers 7a, 7b discharge the objects to be weighed simultaneously, and the lower collecting hopper 9 discharges the objects to be weighed. Thereby, once every time Tr/2, the objects to be weighed are fed to the packaging machine.

Under the state where the combination weigher is operated continuously, the control unit 20 opens the gate of the lower collecting hopper 9 to discharge the objects be weighed to the packaging machine, in response to, for example, a feed command signal received from the packaging machine (time t11, t12, t13, ... ).

In the configuration of FIG. 3, for example, the objects to be weighed which have been discharged from the weighing hopper 4 by opening of the gate at time t11 are collected into the upper collecting hopper 7a, 7b and held therein until time t12, the objects to be weighed which have been discharged from the upper collecting hopper 7a, 7b by opening of the gate of the upper collecting hopper 7a, 7b at time t12 are collected into the lower collecting hopper 9 and held therein until time t13, and discharged to the packaging machine by opening of the gate of the lower collecting hopper 9 at time t13. The objects to be weighed which have been discharged by opening of the gate of the lower collecting hopper 9 at time t13 are fed to the packaging machine before time t13a when the horizontal sealing device 55 of the packaging machine starts horizontal sealing, and horizontal sealing for sealing a portion corresponding to the upper end of the package bag starts at time t13a.

By causing the combination weigher to perform the double shift operation as described above, the objects to be weighed are discharged to the packaging machine once every time Tr/2, and a high-speed discharge operation at a speed which is twice times as high as the speed of the single shift operation is achieved. Thus, the combination weigher can be adapted to the packaging machine operating at a high speed.

The combination weigher of this Embodiment may be configured to perform the triple shift operation. In this case, a discharge cycle time (Td3) associated with the weighing hopper 4 is ⅓ of the actual weighing cycle time (Tr). In the triple shift operation, for example, the number of weighing hoppers 4 in each of the groups A and B may be set to nine so that the total number of weighing hoppers 4 is eighteen, and the number of weighing hoppers 4 which would be selected in the combination process may be set to four. In this case, in the combination process performed repetitively, four weighing hoppers 4 are selected from among about ten weighing hoppers 4, and weighing accuracy which is substantially as high as the weighing accuracy obtained in the case where the single shift operation is performed by setting the total number of weighing hoppers 4 to ten and the number of the objects to be weighed which would be selected in the combination process to four.

In the triple shift operation, once every time Tr/3, the combination process is performed, and the weighing hoppers 4 selected to make up the discharge combination in the combination process discharge the objects to be weighed. Therefore, once every time Tr/3, the combination process is repeated, and the weighing hoppers 4 making up the discharge combination sequentially determined discharge the objects to be weighed to the upper collecting chutes 6A, 6B. Correspondingly, once every time Tr/3, both of the upper collecting hoppers 7a, 7b discharge the objects to be weighed simultaneously, and the lower collecting hopper 9 discharges the objects to be weighed. Thereby, once every time Tr/3, the objects to be weighed are fed to the packaging machine.

By causing the combination weigher to perform the triple shift operation as described above, the objects to be weighed are discharged to the packaging machine once every time Tr/3 and a high-speed discharge operation at a speed which is three times as high as the speed of the single shift operation is achieved. Thus, the combination weigher can be adapted to the packaging machine operating at a high speed.

In order to maintain favorable weighing accuracy and improve a weighing speed in the combination weigher as described above, it is necessary to increase the total number of weighing hoppers 4 which participate in combination calculation.

Although the timings of the gate opening operations of the lower collecting hopper 9, the upper collecting hoppers 7a, 7b and the weighing hoppers 4 are set equal in the above described example (FIG. 2, FIG. 3, etc), they may be set different. For example, the upper collecting hopper 7a, 7b may start opening of the gate after the lower collecting hopper 9 starts opening of the gate, or otherwise, the weighing hoppers 4 making up the discharge combination start opening of the gates after the upper collecting hopper 7a, 7b starts opening of the gate. In a case where a certain time is required from when the weighing hopper 4 starts discharging of the objects to be weighed until a head portion of a batch of the objects to be weighed reach the discharge outlet (upper collecting hopper 7a, 7b) of the upper collecting chute 6A, 6B, the weighing hopper 4 may open the gate a little time before the upper collecting hopper 7a, 7b opens the gate. For example, the control unit 20 causes the lower collecting hopper 9 to start opening of the gate after a predetermined time D1 ($\geqq 0$) from when the feed command signal is received from the packaging machine, causes the upper collecting hopper 7a, 7b to start opening of the gate after a predetermined time D2 ($\geqq 0$) from when the feed command signal is received, causes the weighing hopper 4 to start opening of the gate after a predetermined time D3 ($\geqq 0$) from when the feed command signal is received, and sets D1, D2, D3 as desired. Thus, the timings when the hoppers 4, 7a, 7b, 9 open the gates can be set as desired.

Alternatively, the control unit 20 may individually control the timings when the upper collecting hoppers 7a, 7b open the gates such that the timings when the two upper collecting hoppers 7a, 7b start discharging of the objects to be weighed are different a little. This makes it possible to lessen the collision between the objects to be weighed discharged from the upper collecting hopper 7a and the upper collecting hopper 7b, thereby preventing damage to the objects to be weighed.

Figure 4:
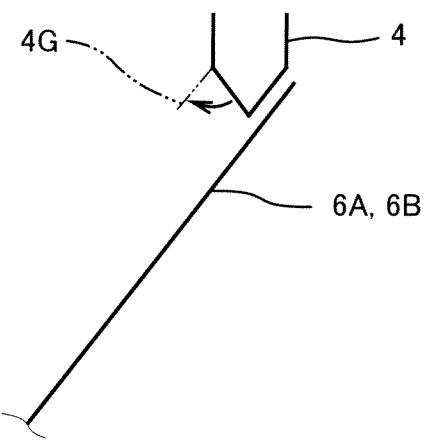
FIG. 4(a) is a schematic view showing a specific positional relationship between the weighing hopper and the upper collecting chute and the configuration of the gate of the weighing hopper in Embodiment 1 of the present invention.
FIG. 4(b) is a schematic view showing a specific positional relationship between the upper collecting hopper and the lower collecting chute and the configuration of the gate of the upper collecting hopper.
Figure 4:
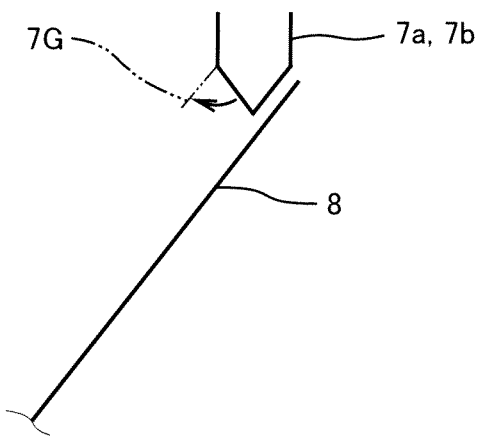

FIG. 4(a) is a schematic view showing a specific positional relationship between the weighing hopper 4 and the upper collecting chute 6A, 6B and the configuration of the gate of the weighing hopper 4, and FIG. 4(b) is a schematic view showing a specific positional relationship between the upper collecting hopper 7a, 7b and the lower collecting chute 8 and the configuration of the gate of the upper collecting hopper 7a, 7b.

As shown in FIG. 4(a), the upper collecting chute 6A, 6B is positioned not to make contact with but to be closest to the weighing hopper 4. The gate 4G of the weighing hopper 4 is one-side open gate which is adapted to open in a direction in which the objects to be weighed fall down, as shown in FIG. 4(a). Since the weighing hopper 4 and the upper collecting chutes 6A, 6B are configured as described above, the objects to be weighed are discharged from the weighing hopper 4 smoothly onto the upper collecting chute 6A, 6B upon opening of the gate 4G of the weighing hopper 4. Thus, the impact generated when the objects to be weighed which have been discharged from the weighing hopper 4 fall down onto the upper collecting chute 6A, 6B is mitigated, and therefore, the damage to the objects to be weighed can be prevented. In addition, bouncing of the objects to be weighed which are falling down, etc, is lessened, thereby reducing a time required for an upper collecting chute transportation time period as will be described later.

Assuming that the weighing hoppers 4 are arranged circularly along the inner side of an imaginary circle in each weighing unit, the diameter of the upper opening of the upper collecting chute 6A, 6B can be made equal to or substantially equal to the diameter of the imaginary circle. The size (diameter) of the imaginary circle is determined by the number of the weighing hoppers 4 arranged and the arrangement pitch of the weighing hoppers 4. The number of the weighing hoppers 4 arranged is determined by the total number of the weighing hoppers 4 and the number of weighing units in the combination weigher. The arrangement pitch of the weighing hoppers 4 is determined by the capacity (volume) of the weighing hopper 4 and a necessary spacing required between adjacent weighing hoppers 4, etc. As the capacity (volume) of the weighing hopper 4 increases, the arrangement pitch increases.

As shown in FIG. 4(b), the positional relationship between the upper collecting hopper 7a, 7b and the lower collecting chute 8 and the configuration of the gate of the upper collecting hopper 7a, 7b are identical to those of the weighing hopper 4 and the upper collecting chute 6A, 6B shown in FIG. 4(a). Upon the gate 7G of the upper collecting hopper 7a, 7b being opened, the objects to be weighed are discharged from the upper collecting hopper 7a, 7b smoothly onto the lower collecting chute 8. Thus, the impact generated when the objects to be weighed which have been discharged from the upper collecting hopper 7a, 7b are falling down onto the lower collecting chute 8 is mitigated, and therefore, damage to the objects to be weighed is reduced. In addition, bouncing of the objects to be weighed which are falling down is lessened, thereby reducing a lower collecting chute transportation time period as described later.

It is sufficient that the lower collecting chute 8 collects the objects to be weighed discharged from the upper collecting hopper 7a, 7b into the lower collecting hopper 9 at discharge outlet at the bottom part thereof. Therefore, the lower collecting chute 8 is easily formed by a gutter-shaped member. For example, the lower collecting chute 8 includes a first gutter-shaped member for guiding the objects to be weighed which have been discharged from the upper collecting hopper 7a to the lower collecting hopper 9 and a second gutter-shaped member for guiding the objects to be weighed which have been discharged from the upper collecting hopper 7b to the lower collecting hopper 9.

Figure 13:
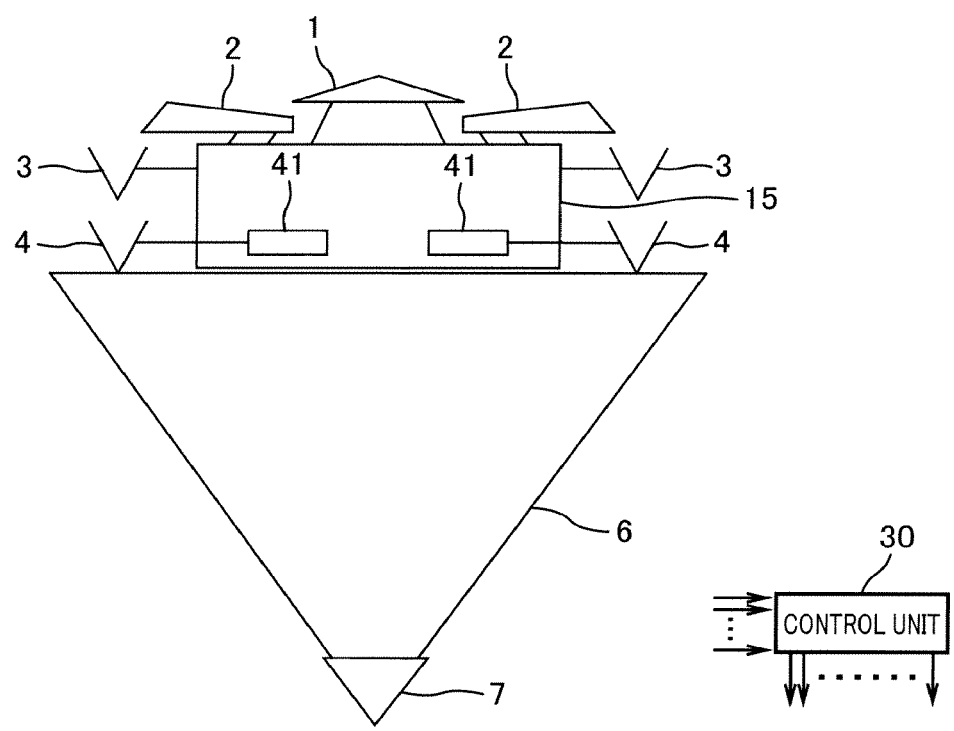
FIG. 13 is a partial cross-sectional schematic view of the conventional combination weigher as viewed from the front.

In this Embodiment, since the weighing hoppers 4 of a predetermined number in the combination weigher are separated into those belonging to the plural weighing units W1, W2, the diameter of the upper opening and height of each of the upper collecting chutes 6A, 6B can be made smaller than those of the collecting chute 6 in the conventional example of FIG. 13, if the arrangement pitch and the total number of the weighing hoppers 4 are both equal between them. For example, if the weighing hoppers 4 are arranged at a constant pitch, the diameter of the circle (e.g., the aforesaid imaginary circle) which is the arrangement shape of the weighing hoppers 4 in the case where nine weighing hoppers 8 are arranged circularly to form one of two circles is the half of the diameter of the circle which is the arrangement shape of the weighing hoppers 4 in the case where eighteen weighing hoppers 4 are arranged circularly at a constant pitch to form a single circle. In this case, the diameter of the upper collecting chutes 6A, 6B disposed below the groups A, B each including the nine weighing hoppers arranged circularly can be reduced to about half of the diameter of the collecting chute 6 disposed below the eighteen weighing hoppers arranged circularly to from a single circle as shown in FIG. 13. In this case, if the tilting angle of the chute surface of the collecting chute is set equal, the height of the upper collecting chute 6A, 6B can be reduced to half of the height of the collecting chute 6 of FIG. 13. In the same manner, if the tilting angle of the chute surface of the collecting chute is set equal, the height of the lower collecting chute 8 can be reduced to half of the height of the collecting chute 6 of FIG. 13. The tilting angle of the chute surface of the collecting chute 6 of FIG. 13 is, for example, about 50 degrees. The tilting angle of the chute surface of each of the upper collecting chutes 6A, 6B, and the lower collecting chute 8 need not be set to be equal to the tilting angle of the collecting chute 6 of FIG. 13.

Since the size of the upper collecting chute 6A, 6B can be reduced as described above, the transportation distance and transportation time period of the objects to be weighed moving (sliding down) on the upper collecting chute 6A, 6B can be reduced, and the objects to be weighed which have been discharged from the weighing hoppers 4 can be collected into the upper collecting hopper 7a, 7b before its batch length gets large and can be held therein in a single lump state. For this reason, even in the objects to be weighed, having a characteristic in which its batch time on the collecting chute tends to be long, even in the case where the total number of the weighing hoppers 4 is large, or even in the case where the volume of the weighing hopper 4 is large and the arrangement pitch of the weighing hoppers 4 must be set longer, it is possible to reduce the batch time (e.g., time required for a time period tb of FIG. 2) of the objects to be weighed on the upper collecting chute 6A, 6B. As used herein, the term "batch time" of the objects to be weighed on the upper collecting chute 6A, 6B refers to a time period from when a head portion of a batch of the objects to be weighed which have been discharged from the weighing hoppers 4 making up the discharge combination to the upper collecting chute 6A, 6B reach a discharge outlet (collecting hopper 7a, 7b) of the upper collecting chute 6A, 6B until a tail portion of a batch of the objects to be weighed reach the discharge outlet (collecting hopper 7a, 7b) of the upper collecting chute 6A, 6B.

Since the upper collecting hoppers 7a, 7b are provided at the discharge outlets of the upper collecting chutes 6A, 6B, respectively, the objects to be weighed can be discharged to the lower collecting chute 8 in a lump state. Thus, since the objects to be weighed can be discharged in a lump state from the upper collecting hoppers 7a, 7b onto the lower collecting chute 8, and the size of the lower collecting chute 8 is reduced, the transportation distance and transportation time period of the objects to be weighed moving (sliding down) on the lower collecting chute 8 can be reduced, and the objects to be weighed which have been discharged from the upper collecting hoppers 7a, 7b can be collected into the lower collecting hopper 9 before its batch length gets large and can be held therein in a lump state. For this reason, even in the objects to be weighed, having a characteristic in which its batch time on the collecting chute tends to be long, even in the case where the total number of the weighing hoppers 4 is large, or even in the case where the volume of the weighing hopper 4 is large and the arrangement pitch of the weighing hoppers 4 must be set longer, it is possible to reduce the batch time (e.g., time required for a time period td of FIG. 2) of the objects to be weighed on the lower collecting chute 8. Furthermore, because of the presence of the lower collecting hopper 9, the objects to be weighed can be discharged in a lump state into an inlet of the packaging machine. As used herein, the term "batch time" of the objects to be weighed on the lower collecting chute 8 refers to a time period from when a head portion of a batch of the objects to be weighed which have been discharged from the upper collecting hopper 7a, 7b to the lower collecting chute 8 reach a discharge outlet (collecting hopper 9) of the lower collecting chute 8 until a tail portion of a batch of the objects to be weighed reach the discharge outlet (collecting hopper 9) of the lower collecting chute 8.

As should be understood from above, the batch time of the objects to be weighed on each of the upper and lower collecting chutes can be reduced, regardless of the characteristic of the objects to be weighed, the total number of the weighing hoppers 4, etc, thereby enabling a high-speed operation. By setting the batch time (tb, td) of the objects to be weighed on each of the upper and lower collecting chutes to a time which is not longer than a certain time (allowable batch time) assumed for each shift operation and each collecting chute, in the configuration for causing the combination weigher to perform the above mentioned operation such as the single shift operation, the double shift operation or the triple shift operation, thereby enabling a high-speed operation without decreasing the operation speed.

The phrase "allowable batch time assumed for each shift operation and each collecting chute is, for example, a time obtained by subtracting a batch inhibiting time S which is a certain time predetermined for each collecting chute from a desired discharge cycle time (Td1, Td2, Td3) for each shift operation. In this case, by setting a desired discharge cycle time Td1=T (ideal weighing cycle time) when the combination weigher performs the single shift operation, the operation at a maximum speed is achieved. In the same manner, by setting a desired discharge cycle time Td2=T/2 when the combination weigher performs the double shift operation, the operation at a maximum speed is achieved, while by setting a desired discharge cycle time Td3=T/3 when the combination weigher performs the triple shift operation, the operation at a maximum speed is achieved. In the configuration of FIG. 1, for example, the batch inhibiting time S for the upper collecting chute 6A, 6B is a time period when the gate of the upper collecting hopper 7a, 7b is open to discharge the objects to be weighed, while the batch inhibiting time S for the lower collecting chute 8 is a time period when the gate of the lower collecting hopper 9 is open to discharge the objects to be weighed. As described later, when the lower collecting hopper 9 is omitted, the batch inhibiting time S for the lower collecting chute 8 is set to a time which will not impede the operation (e.g., horizontal sealing operation) of the packaging machine located below. The batch time of the objects to be weighed on each of the upper and lower collecting chutes may be determined by conducting a test (e.g., test using a test machine) using the objects to be weighed which are weighed by the combination weigher.

The collecting chutes and other members are designed and manufactured so that the batch times of the objects to be weighed on the upper and lower collecting chutes are not longer than the allowable batch times and the objects to be weighed which are discharged previously are not mixed with the objects to be weighed which are discharged next on each collecting chute.

For example, in the configuration for causing the combination weigher to perform the single shift operation, as shown in FIG. 2, when the gate of the weighing hopper 4 is opened during a time period to (time period from when the gate of the weighing hopper 4 starts opening, it is open, and until it is closed), the objects to be weighed which have been discharged from the weighing hopper 4 are fed to the upper collecting hopper 7a, 7b during a time period tb. At time t2 just after a lapse of a time period α (hereinafter referred to as upper collecting chute transportation time period) from when the gate of the weighing hopper 4 starts opening until a portion of a batch of the objects to be weighed which reach the upper collecting hopper 7a, 7b last, are fed to the upper collecting hopper 7a, 7b, the gate of the upper collecting hopper 7a, 7b is opened to discharge the objects to be weighed. In this Embodiment, the upper collecting chutes 6A, 6B are configured so that the upper collecting chute transportation time period α is not longer than the discharge cycle time Td1 (=Tr). In this case, if the upper collecting chute transportation time period α is set much longer than the discharge cycle time Td1, then there is a chance that two batches of the objects to be weighed which have been discharged from the weighing hoppers 4 exist on the upper collecting chute 6A, 6B and are mixed, which is undesirable (event 1). The weighing speed is not increased if the upper collecting chute transportation time period α is set shorter than the discharge cycle time Td1, leading to a situation where the moving speed of the objects to be weighed increases and the objects to be weighed are more likely to be damaged (event 2). From an empirical rule, in light of the event 1, it is desired that the upper collecting chute transportation time period α be set to a time which is not longer than 1.1 times as long as the discharge cycle time Td1. Furthermore, in light of the event 2, it is desired that the upper collecting chute transportation time period α be set to a time which is within a range of 0.9 to 1.1 times as long as the discharge cycle time Td1. In light of the above, the upper collecting chutes 6A, 6B are configured so that the upper collecting chute transportation time period α be set to a time which is not longer than 1.1 times as long as the discharge cycle time Td1 (=Tr) and not shorter than 0.9 time as long as the discharge cycle time Td1(=Tr). For example, by making the slope of the chute surface of the upper collecting chute 6A, 6B steep, the upper collecting chute transportation time period α is made shorter, whereas by making the slope gentle, the upper collecting chute transportation time period α is made longer. It is sufficient that the discharge time period (gate open time period of the upper collecting hopper 7a, 7b) tc when the objects to be weighed are discharged from the upper collecting hopper 7a, 7b is set to a time period other than the time period tb when the objects to be weighed are fed to the upper collecting hopper 7a, 7b. When the upper collecting chute transportation time period α is longer than the discharge cycle time Td1 and is not longer than 1.1 times as long as the discharge cycle time Td1, for example, the control unit 20 controls the weighing hopper 4 so that its gate starts opening before the gate of the upper collecting hopper 7a, 7b starts opening.

The batch time (tb) of the objects to be weighed on the upper collecting chute 6A, 6B increases as the transportation distance (transportation time period) of the objects to be weighed sliding down on the upper collecting chute 6A, 6B increases. Therefore, as described above, by configuring the upper collecting chute 6A, 6B so that the upper collecting chute transportation time period α is a time which is not longer than 1.1 times as long as the discharge cycle time Td1, it is possible to set the batch time (tb) of the objects to be weighed on the upper collecting chute 6A, 6B to the allowable batch time (Td1−tc) or shorter. In addition, since it is possible to avoid an event that the objects to be weighed which are previously discharged from the weighing hoppers 4 and the objects to be weighed which are next discharged from the weighing hoppers 4 coexist at the same time on the upper collecting chute 6A, 6B, it is possible to surely prevent the previous batch of objects to be weighed from being mixed with the next batch of objects to be weighed on the upper collecting chute 6A, 6B.

The lower collecting chute 8 may be configured in the same manner. To be specific, the lower collecting chute 8 is configured such that the time period (hereinafter referred to as lower collecting chute transportation time period) β from when the gate of the upper collecting hopper 7a, 7 starts opening until a portion of the objects to be weighed which reach the lower collecting hopper 9 last are fed to the lower collecting hopper 9 is set to a time which is not longer than 1.1 times as long as the discharge cycle time Td1 (=Tr), and is not shorter than 0.9 time as long as the discharge cycle time Td1 (=Tr). It is sufficient that the discharge time period (gate open time period of the lower collecting hopper 9) te when the objects to be weighed are discharged from the lower collecting hopper 9 is set to a time period other than the time period td when the objects to be weighed are fed to the lower collecting hopper 9.

The batch time (td) of the objects to be weighed on the lower collecting chute 8 increases as the transportation distance (transportation time period) of the objects to be weighed sliding down on the lower collecting chute 8 increases. Therefore, as described above, by configuring the lower collecting chute 8 so that the lower collecting chute transportation time period β to a time which is not longer than 1.1 times as long as the discharge cycle time Td1, it is possible to set the batch time (td) of the objects to be weighed on the lower collecting chute 8 to the allowable batch time (Td1−te) or shorter. In addition, since it is possible to avoid an event that the objects to be weighed which are previously discharged from the upper collecting hopper 7a, 7b and the objects to be weighed which are next discharged from the upper collecting hopper 7a, 7b exist at the same time on the lower collecting chute 8, it is possible to surely prevent the previous batch of objects to be weighed from being mixed with the next batch of objects to be weighed on the lower collecting chute 8.

As should be appreciated from the above, since the upper collecting chute 6A, 6B and the lower collecting chute 8 are configured based on a desired discharge cycle time, etc, it is possible to surely avoid mixing between the previous batch of objects to be weighed and the next batch of objects to be weighed on the upper collecting chute 6A, 6B and the lower collecting chute 8, and the operation at a desired discharge cycle time Td1 (=Tr) is achieved.

In the configuration for causing the combination weigher to perform the double shift operation, in the same manner, it is sufficient that the upper collecting chute 6A, 6B is configured such that the upper collecting chute transportation time period is set to a time which is not longer than 1.1 times as long as the discharge cycle time Td2 (=Tr/2), and is not shorter than 0.9 time as long as the discharge cycle time Td2 (=Tr/2), and the lower collecting chute 8 is configured such that the lower collecting chute transportation time period is set to a time which is not longer than 1.1 times as long as the discharge cycle time Td2 (=Tr/2), and is not shorter than 0.9 time as long as the discharge cycle time Td2 (=Tr/2). In the configuration for causing the combination weigher to perform the triple shift operation, it is sufficient that the upper collecting chute 6A, 6B is configured such that the upper collecting chute transportation time period is set to a time which is not longer than 1.1 times as long as the discharge cycle time Td3 (=Tr/3), and is not shorter than 0.9 time as long as the discharge cycle time Td3 (=Tr/3), and the lower collecting chute 8 is configured such that the lower collecting chute transportation time period is set to a time which is not longer than 1.1 times as long as the discharge cycle time Td3 (=Tr/3), and is not shorter than 0.9 time as long as the discharge cycle time Td3 (=Tr/3).

Having described above that the actual weighing cycle Tr is equal to the ideal weighing cycle time T, the actual weighing cycle time Tr is sometimes longer than the ideal weighing cycle time T. For example, when the ideal weighing cycle time T is 850 ms, the maximum weighing speed in the single shift operation is 60000÷850=70 times/minute, the maximum weighing speed in the double shift operation is 140 times/minute, and the maximum weighing speed in the triple shift operation is 210 times/minute. In the operation at the maximum weighing speed, the actual weighing cycle time Tr is equal to the ideal weighing cycle time T. To operate the packaging machine at the maximum speed, for example, 120 times/minute (packaging cycle time is 500 ms), it is sufficient that the combination weigher achieves the weighing speed of 120 times/minute. Therefore, it is sufficient that the combination weigher is configured to perform the double shift operation such that the discharge cycle time Td2 (=Tr/2) is 500 ms. In this case, the actual weighing cycle time Tr is 1000 ms. To operate the packaging machine at the maximum speed, for example, 200 times/minute (packaging cycle time is 300 ms), it is sufficient that the combination weigher achieves the weighing speed of 200 times/minute. Therefore, it is sufficient that the combination weigher is configured to perform the triple shift operation such that the discharge cycle time Td3 (=Tr/3) is 300 ms. In this case, the actual weighing cycle time Tr is 900 ms. Thus, the weighing speed of the combination weigher is determined according to the maximum speed of the packaging machine, and the collecting chute (6A, 6B, 8), etc is configured as described above based on the discharge cycle time or the like according to the weighing speed. This enables the combination weigher to operate at the weighing speed according to the maximum speed of the packaging machine and the packaging machine to operate at the maximum speed.

Figure 5:
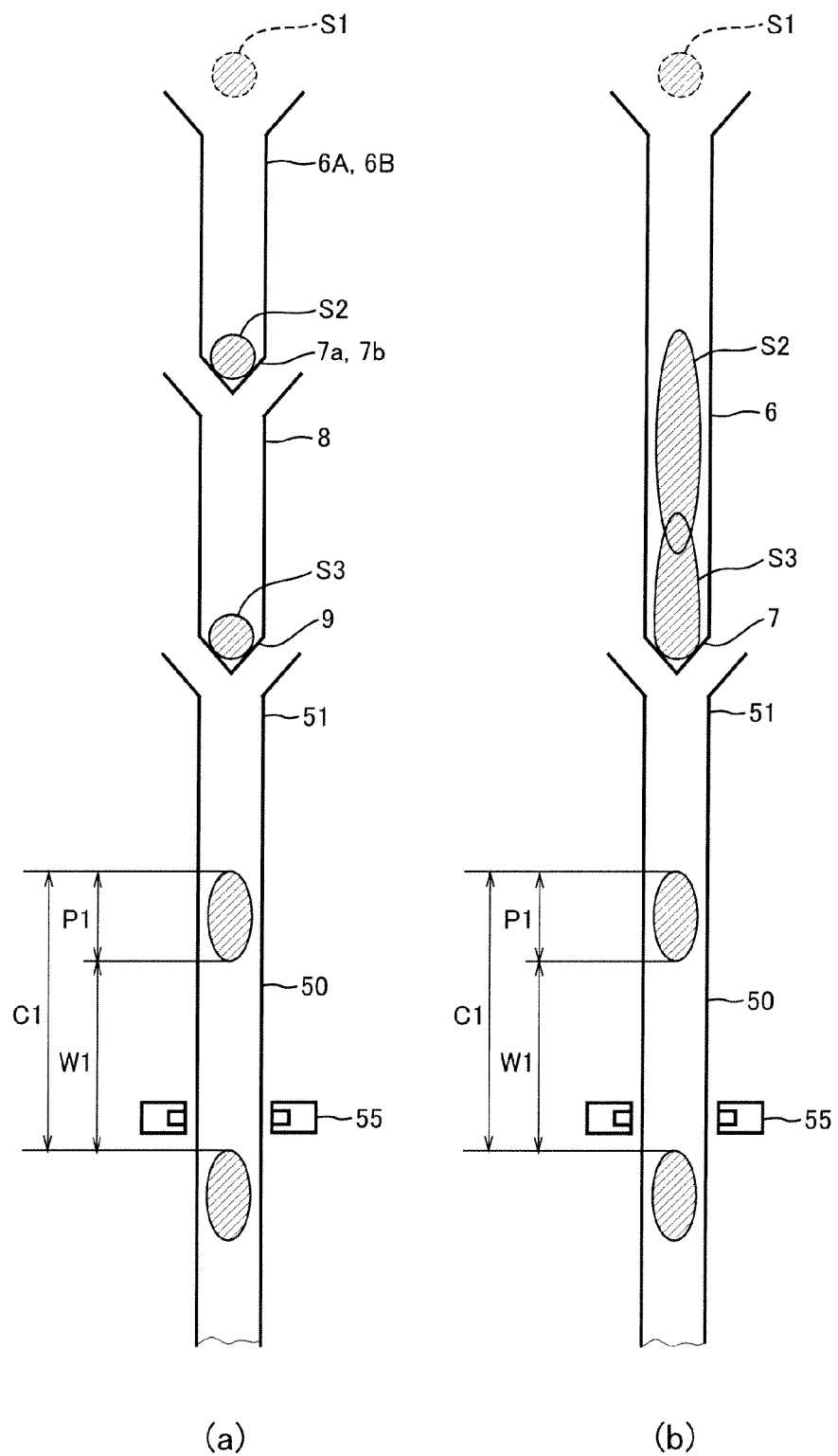
FIG. 5(a) is a schematic view showing an exemplary falling state of the objects to be weighed inside the combination weigher and the packaging machine in Embodiment 1 of the present invention.
FIG. 5(b) is a schematic view showing an exemplary falling state of the objects to be weighed inside the conventional combination weigher and the packaging machine shown in FIG. 13.

FIG. 5(*a*) is a schematic view showing an exemplary falling state of the objects to be weighed inside the combination weigher and the packaging machine in Embodiment 1, and FIG. 5(*b*) is a schematic view showing an exemplary falling state of the objects to be weighed inside the conventional combination weigher shown in FIG. 13 and the packaging machine. In FIGS. 5(*a*) and 5(*b*), the objects to be weighed S1 indicated by a broken line are objects to be weighed staying inside the weighing hopper 4.

As shown in FIG. 5(*a*), it is supposed that the objects to be weighed (one batch), for example, potato chips, fall down in succession from the lower collecting hopper 9 of the combination weigher of Embodiment 1 at a falling pitch C1 of 600 mm, and the length (hereinafter referred to as length of a batch of the objects to be weighed) P1 from a head portion to a tail portion of a batch of the objects to be weighed which have been discharged from the lower collecting hopper 9 and are falling down inside the packaging machine is 200 nm. In this case, a distance W1=C1−P1 between the batches of the objects to be weighed which are falling down in succession is 400 mm. Assuming that the falling speed of the objects to be weighed is, for example, 1400 mm/second and constant, the time pitch at which the objects to be weighed are falling down is 600 mm÷1400 mm/second=0.43 second, and the weighing speed of the combination weigher is 60 second÷0.43 second/time=140 times/minute. The falling pitch of the objects to be weighed is a distance from the tail portion (or the head portion) of a batch of the objects to be weighed to a tail portion (or a head portion) of a next batch of the objects to be weighed.

To perform the horizontal sealing in the packaging machine, the horizontal sealing device 55 is required to be operated to seize a portion of the rapping material 50 between the batches of the objects to be weighed. Therefore, there is a chance that the objects to be weighed will be stuck in a sealing portion of a package bag unless the distance (W1) between the batches of the objects to be weighed is about 200 mm or more. In the example of FIG. 5(*a*), the objects to be weighed which have been lumped together by the lower collecting hopper 9 are discharged therefrom. This increases the distance between the batches of the objects to be weighed, and therefore a time for horizontal sealing performed by the packaging machine can be more easily ensured.

As shown in FIG. 5(*b*), the objects to be weighed which are discharged from the collecting hopper 7 of the conventional combination weigher shown in FIG. 13 have the falling pitch C1, the length P1 of a batch of the objects to be weighed, and the distance W1 between the batches of objects to be weighed, and the weighing speed of the combination weigher is 140 times/minute, similarly to the example of FIG. 5(*a*). However, in this case, previous batch S3 of objects to be weighed overlaps with next batch S2 of objects to be weighed on the collecting chute 6. This is because as the sliding distance of the objects to be weighed which are sliding down on the collecting chute 6 increases, the length of a batch of the objects to be weighed which are sliding down on the collecting chute 6 increases. In the state where the batches of the objects to be weighed overlap with each other in this way, the objects to be weighed are stuck in the gate of the collecting hopper 7, regardless of the timing when the gate is opened and closed. In addition, since one batch of objects to be weighed cannot clearly separated from other batch, it is difficult to correctly accommodate one batch of objects to be weighed into a package bag. As a result, the weight of the objects to be weighed inside the package bag contains a substantial error, which is unsuitable for practical use.

In the example shown in FIG. 5(*b*), if the length of a batch of the objects to be weighed on the collecting chute 6 is not so large as that shown in FIG. 5(*b*), there is a sufficient distance between the previous batch S3 of objects to be weighed and the next batch S2 of objects to be weighed and therefore the collecting hopper 7 can perform the opening and closing operation of the gate without any interference and without the objects to be weighed being stuck in the gate of the collecting hopper 7, then the object to be weighed will not be stuck in the gate of the collecting hopper 7 or the weight of the objects to be weighed inside the packaging machine will contain no error unlike in the example of FIG. 5(b). However, in this case, long before the previous batch of object to be weighed are made into a lump in the collecting hopper 7 and the collecting hopper 7 starts discharging of the objects to be weighed to the packaging machine located below, the weighing hopper 4 must start discharging of a next batch of objects to be weighed. This will not arise a problem when the packaging machine is operated stably without stopping, but will arise a severe problem when the packaging machine is stopped, because for example, the packaging machine has run out of packaging film or date print film. In this case, in the combination weigher, since the weighing hopper 4 must discharge the next batch of objects to be weighed long before the collecting hopper 7 discharges the objects to be weighed. Therefore, whenever the packaging machine stops, two batches of object to be weighed will stay inside the collecting hopper 7, and the weight of the objects to be weighed inside the packaging machine will contain a substantial error if these two batches are discharged to the packaging machine. Therefore, this case is not virtually practical, either. Of course, the operation speed of the combination weigher may be reduced and the weighing hopper 4 may be configured not to discharge the objects to be weighed until the gate of the collecting hopper 7 starts opening. But, a significant problem that the packaging machine cannot exhibit its highest ability will arise.

In contrast, in this Embodiment, the plural upper collecting chutes 6A, 6B which have upper openings of a smaller diameter and a smaller height and have a shorter sliding distance (transportation distance) of objects to be weighed than the conventional collecting chute 6 are provided, the lower collecting chute 8 which collects the objects to be weighed which are discharged from the upper collecting chutes 6A, 6B and along which the objects to be weighed slide down over a shorter distance than the conventional collecting chute 6 are provided, and the collecting hoppers 7a, 7b, 9 are provided at discharge outlets of the collecting chutes 6A, 6B, 8, respectively. In this case, since the sliding distances of the objects to be weighed inside the upper collecting chute 6A, 6B and the lower collecting chute 8 are shorter than that of the conventional collecting chute 6, the objects to be weighed are held in the associated collecting hoppers 7a, 7b, 9, before the length of a batch of the objects to be weighed gets large (before the batch length of the objects to be weighed gets large), as compared to the conventional collecting chute 6. Therefore, unlike the example shown in FIG. 5(b), the object to be weighed are prevented from being stuck in the gate of the collecting hopper 7, and the weight of the objects to be weighed inside the packaging machine does not contain a substantial error. In addition, when the previous batch S3 of objects to be weighed is made into a lump in the collecting hopper 9, and the gate of the lower collecting hopper 9 is opened in response to a feed command signal of the packaging machine, the next batch S2 of objects to be weighed stay in the upper collecting hopper 7a, 7b, and the still next batch S1 of objects to be weighed stay inside the weighing hopper 4. Therefore, the above mentioned problem that two batches of objects to be weighed stay in the collecting hopper when the packaging machine stops will not arise.

Even in the case where the weighing hopper 4 is controlled to open the gate a little time before the upper collecting hopper 7a, 7b opens the gate, a problem that two batches of objects to be weighed stay in the collecting hopper when the packaging machine stops as described above can be solved in such a manner that the weighing hopper 4 is configured to open the gate in response to the feed command signal from the packaging machine, and thereby the objects to be weighed are not discharged from the weighing hopper 4 when the packaging machine stops.

As should be appreciated from the above, to achieve a desired weighing speed (e.g., aforesaid 140 times/minute) in the conventional weigher in which, for example, all of the weighing hoppers 4 are arranged on a circumference as shown in FIG. 13, a next batch of objects to be weighed must be sometimes discharged from the weighing hopper 4 in a time period when a previous batch of objects to be weighed stay on the collecting chute 6 and on the collecting hopper 7. In this case, like this Embodiment, plural weighing units W1, W2 are provided such that all of the weighing hoppers 4 are divided into plural groups A and B which are each disposed on a single circumference and small upper collecting chutes 6A, 6B are provided, and the lower collecting chute 8 is provided. The upper collecting chute 6A, 6B is configured so that the upper collecting chute transportation time period is not longer than 1.1 times as long as the discharge cycle time according to a desired weighing speed, and the lower collecting chute 8 is configured so that the lower collecting chute transportation time period is not longer than 1.1 times as long as the discharge cycle time. Thereby, the above mentioned problem can be solved.

Since the diameter of the upper opening of the upper collecting chute 6A, 6B is smaller than that of the conventional collecting chute 6, the curvature radius of the chute surface of the upper collecting chute 6A, 6B is small. Thereby, the horizontal length of a batch of the objects to be weighed which have been discharged from the weighing hopper 4 on the upper collecting chute 6A, 6B is reduced, and the length of a batch of the objects to be weighed which are sliding down is reduced. This contributes to reduction of the upper collecting chute transportation time period.

In the case where the objects to be weighed which are discharged from the weighing hoppers 4 making up the discharge combination are collected into M (M is plural number and is 2 in the configuration of FIG. 1) upper collecting hoppers 7a, 7b, the amount of objects to be weighed collected into the upper collecting hoppers 7a, 7b is 1/M in average as compared to the case where the objects to be weighed are collected into a single collecting hopper (FIG. 13) in the conventional example. Thus, it is possible to lessen bouncing or the like of the objects to be weighed at the collision between the objects to be weighed or at the collision of the objects to be weighed against the inner wall of the collecting hopper. This contributes to reduction of the upper collecting chute transportation time period.

Since the transportation distance over which the objects to be weighed slide down on each of the upper collecting chutes 6A, 6B and the lower collecting chute 8 is short, the maximum speed at the sliding down is suppressed to a low one. Thus, the impact generated when the objects to be weighed collide with each other, or the impact generated when the objects entering the collecting hopper 7a, 7b, 9 collide against the inner wall of the collecting hopper is mitigated, thereby preventing the damage to the objects to be weighed. The fact that the maximum speed of the objects to be weighed which are sliding down is suppressed to a low one, contributes to lessening of bouncing or the like at the collision between the objects to be weighed or at the collision of the objects to be weighed against the inner wall of the collecting hopper, and hence to reduction of the upper collecting chute transportation time period and the lower collecting chute transportation time period.

Furthermore, in this Embodiment, as described above, since the diameter of the upper opening of each of the upper collecting chutes 6A, 6B can be reduced to about a half of that of the conventional example of FIG. 13, if the arrangement pitch of the weighing hoppers 4 and the total number of the weighing hoppers 4 are the same. Therefore, the installation area of the combination weigher can be reduced to about a half of that of the conventional example of FIG. 13.

In this Embodiment, if the batch length of a batch of the objects to be weighed which are discharged from the upper collecting hopper 7a, 7b onto the lower collecting chute 8 is sufficiently small, the length of a batch of the objects to be weighed which are discharged from the discharge outlet at the bottom part of the lower collecting chute 8 can be made small without the lower collecting hopper 9 and the packaging operation of the packaging machine is not impeded without the lower collecting hopper 9, the lower collecting hopper 9 may be omitted. In this case, the objects to be weighed which have been discharged from the upper collecting hopper 7a, 7b are discharged to the inlet of the packaging machine through the lower collecting chute 8. Because of the omission of the lower collecting hopper 9, the configuration is simplified and the control therefor becomes unnecessary.

In this Embodiment, the size (volume) of the upper collecting hoppers 7a, 7b can be reduced, by configuring the setting in the combination process so that at least one weighing hopper 4 is selected without fail from those belonging to each of the groups A, B respectively corresponding to the upper collecting chutes 6A, 6B to make up the discharge combination, or a maximum number of the weighing hoppers 4 selected from those belonging to each of the groups A and B is limited to less than the number of the weighing hoppers 4 which would be selected. For example, when four weighing hoppers 4 are selected to make up the discharge combination (when the number of weighing hoppers 4 which would be selected is four), combination calculation is performed under a condition in which at least one weighing hopper 4 is selected without fail from those belonging to each of the groups A, B, or a maximum number of the weighing hoppers 4 which are selected from those belonging to each of the groups A, B is three. If such a condition is not set, then the upper chute collecting hopper 7a, 7b is required to have a volume for accommodating the objects to be weighed which have been discharged from the four weighing hoppers 4. However, if the aforesaid condition is set, the number of weighing hoppers 4 which discharge the objects to be weighed to each of the upper collecting chutes 6A, 6B is three at maximum. Therefore, it is sufficient that each of the upper collecting hoppers 7a, 7b is formed to have a volume for accommodating the objects to be weighed from the three weighing hoppers 4. In other words, by determining the discharge combination so that the objects to be weighed which are held in the weighing hoppers 4 making up the discharge combination for discharging of the objects to be weighed to the upper collecting chutes 6A, 6B are always discharged to the two upper collecting chutes 6A, 6B, the size of the collecting hoppers 7a, 7b can be reduced.

Figure 6:
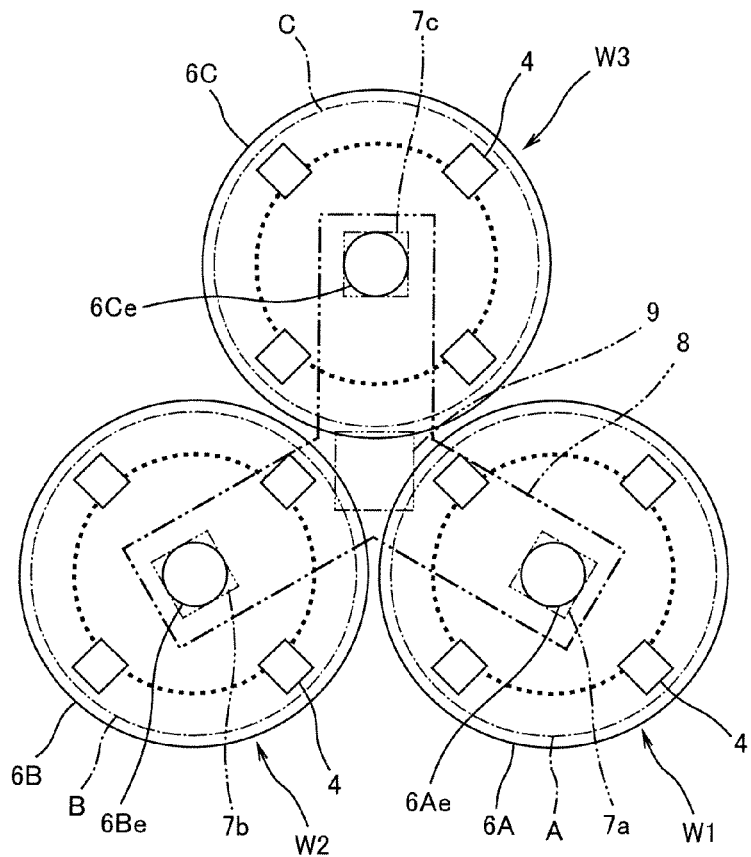
FIGS. 6(a) and 6(b) are schematic views of the upper collecting chutes and the weighing hoppers of a combination weigher including three weighing units in Embodiment 1 of the present invention, as viewed from above.
Figure 6:
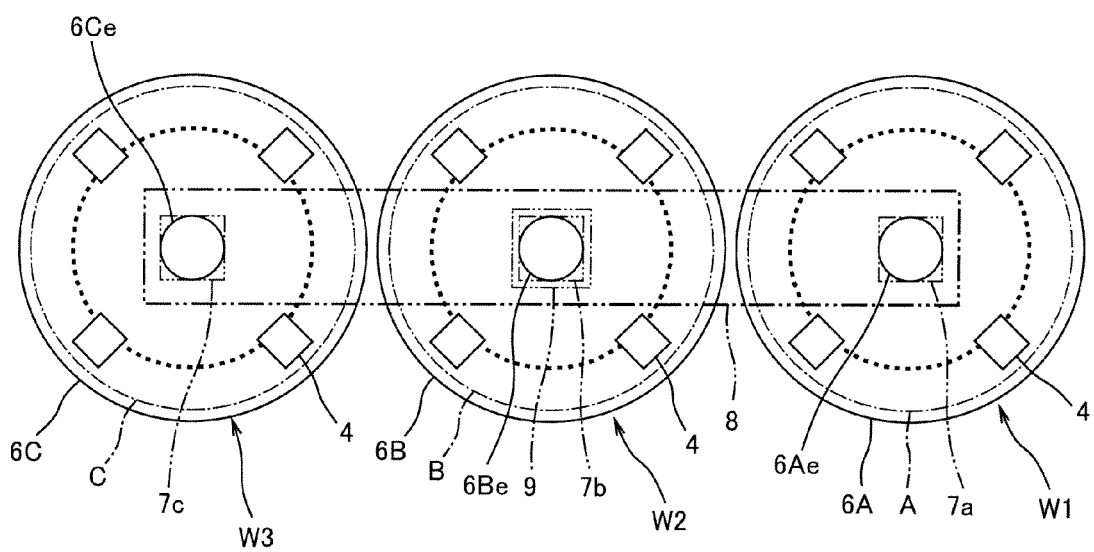

Although the combination weigher includes two weighing units W1, W2 in the example shown in FIG. 1, it may include three or more weighing units having a similar structure as shown in FIGS. 6(*a*) and 6(*b*), for example.

FIGS. 6(*a*) and 6(*b*) are schematic views of exemplary combination weighers each including three weighing units, showing the upper collecting chutes and the weighing hoppers in the combination weighers, as viewed from above.

In the example shown in FIG. 6(*a*), three weighing units W1~W3 are arranged adjacent each other in a planar arrangement. In this case, the groups A~C of the weighing hoppers in the weighing units W1~W3 are arranged such that the centers of the circles which are the arrangement shapes of the weighing hoppers 4 are positioned at vertexes of an equilateral triangle shape, respectively, and according to this, the three upper collecting chutes 6A~6C are disposed such that the centers of circles which are their upper opening shapes are positioned at vertexes of the equilateral triangle, respectively. In the example shown in FIG. 6(*b*), the three weighing units W1~W3 are aligned in a straight-line shape in a planar arrangement.

In both of the examples of FIGS. 6(*a*) and 6(*b*), the three weighing units W1~W3 each having a configuration similar to that of the weighing units W1, W2 of FIG. 1 are provided, a single lower collecting chute 8 is provided below the upper collecting hoppers 7a~7c of the three weighing units W1~W3, and the lower collecting hopper 9 is provided at the discharge outlet of the bottom part of the lower collecting chute 8. The upper collecting hoppers 7a~7c are provided at discharge outlets 6Ae~6Ce of the upper collecting chutes 6A~6C of the weighing units W1~W3, respectively.

The control unit 20 (see FIG. 1) determines weighing hoppers 4 making up a discharge combination from among the weighing hoppers 4 in all of the weighing hopper groups A, B, C respectively corresponding to the three weighing units W1~W3.

In the configurations of FIGS. 6(*a*), 6(*b*), the objects to be weighed which have been discharged from the weighing hoppers 4 making up the discharge combination slide down on the upper collecting chutes 6A~6C, are held in the collecting hoppers 7a~7c, and thereafter are discharged therefrom. The objects to be weighed which have been discharged from the upper collecting hoppers 7a~7c slide down on the lower collecting chute 8, are held in the lower collecting hopper 9, and thereafter are discharged to the inlet of the packaging machine.

In the configurations of FIGS. 6(*a*) and 6(*b*), the diameter of the upper opening of each of the upper collecting chutes 6A, 6B, 6C can be reduced to about ⅓ of that of the conventional collecting chute 6 in the conventional example of FIG. 13, if the arrangement pitch and total number of the weighing hoppers 4 are the same. Therefore, the transportation distance and transportation time period of the objects to be weighed which move on (slide down on) the upper collecting chutes 6A, 6B, 6C can be reduced, and the installation area of the entire combination weigher can be reduced to about ⅓. If the tilting angle of the chute surface of the collecting chute is set equal, the height of the upper collecting chutes 6A, 6B, 6C can be reduced to about ⅓ of the height of the collecting chute 6 of FIG. 13.

In the configuration of FIG. 6(*a*), if the tilting angle of the chute surface is set equal, the height of the lower collecting chute 8 can be reduced to about 0.4 time of the height of the collecting chute 6 of FIG. 13. Therefore, a sum of the height of the lower collecting chute 8 and the height of the upper collecting chute 6A, 6B, 6C can be made shorter than the height of the collecting chute 6 of FIG. 13, and the height of the entire combination weigher can be reduced.

In the configuration of FIG. 6(*b*), if the tilting angle of the chute surface is set equal, the height of the lower collecting chute 8 can be reduced to about ⅔ of the height of the collecting chute 6 of FIG. 13. In this case, the height of the entire combination weigher is substantially equal to that of the conventional example of FIG. 13.

In both of the configurations of FIGS. 6(*a*) and 6(*b*), the transportation time period of the objects to be weighed which are moving down (sliding down) on the lower collecting chute 8 can be reduced as compared to the collecting chute 6 in the conventional example. In the configuration of FIG. 6(*a*), since the distances from the three upper collecting hoppers 7a~7c to the discharge outlet of the lower collecting chute 8 and to the lower collecting hopper 9 provided at the discharge outlet thereof can be made evenly short, the transportation time period of the objects to be weighed which are discharged from the three upper collecting hoppers 7a~7c and are moving down on the lower collecting chute 8 can be reduced.

In both of the examples of FIGS. 6(a) and 6(b), similarly to the example of FIG. 1, the upper and lower collecting chutes 6A, 6B, 6C, 8 may be configured according to the cases where the combination weigher is configured to perform the single shift operation, the combination weigher is configured to perform the double shift operation, and the combination weigher is configured to perform the triple shift operation, and based on discharge cycle times according to desired weighing speeds, etc.

In the examples of FIGS. 6(a) and 6(b), if the batch length of a batch of the objects to be weighed which are discharged from the upper collecting hoppers 7a~7b onto the lower collecting chute 8 is sufficiently small, the length of a batch of the objects to be weighed which are discharged from the discharge outlet at the bottom part of the lower collecting chute 8 can be made small without the lower collecting hopper 9 and the packaging operation of the packaging machine is not impeded without the lower collecting hopper 9, then the lower collecting hopper 9 may be omitted.

In the examples of FIGS. 6(a) and 6(b), the size of the upper collecting hoppers 7a, 7b, 7c can be reduced, by configuring the setting in the combination process so that at least one weighing hopper 4 making up the discharge combination is selected without fail from those belonging to two or more of the groups A, B and C respectively corresponding to the upper collecting chutes 6A, 6B and 6C, or a maximum number of the weighing hoppers 4 selected from those belonging to each of the groups A, B and C is limited to less than the number of the weighing hoppers 4 which would be selected.

Figure 7:
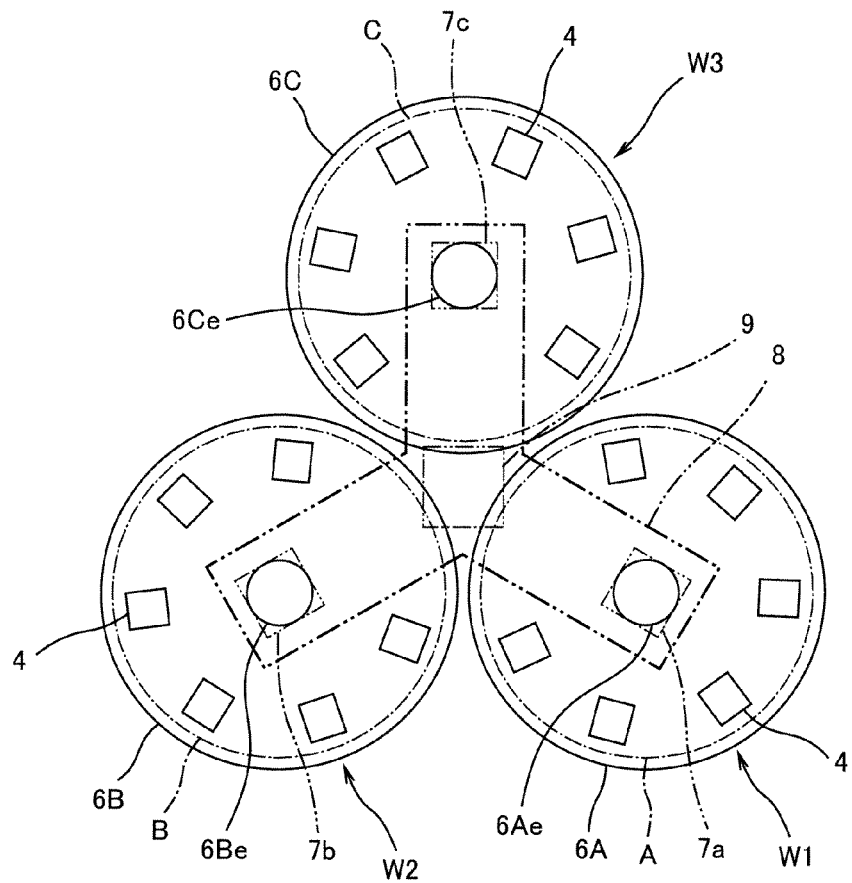
FIG. 7 is a schematic view of the upper collecting chutes and the weighing hoppers of a combination weigher including three weighing units in Embodiment 1 of the present invention, as viewed from above, showing a modification of the arrangement of the weighing hoppers.

In the case where the three weighing units W1~W3 are arranged adjacent each other shown in FIG. 6(a), the weighing hoppers 4 may be arranged as shown in FIG. 7.

In the example of FIG. 7, no weighing hopper 4 is disposed in a region where the three weighing units W1~W3 are arranged adjacent each other and which is surrounded by the three weighing units W1~W3. In other words, the groups A~C of the weighing hoppers in the weighing units W1~W3 are configured such that the centers of the circles which are the arrangement shapes of the weighing hoppers 4 are positioned on vertexes of the equilateral triangle and no weighing hopper 4 is disposed within the equilateral triangle. FIG. 7 illustrates a configuration in which each of the weighing units W1~W3 includes six weighing hoppers 4 and the total number of weighing hoppers 4 is eighteen. In this case, for example, the size of the upper collecting chutes 6A, 6B, 6C may be determined assuming that each of the weighing units W1~W3 includes seven weighing hoppers 4, six weighing hoppers 4 are arranged on a circumference on which seven weighing hoppers 4 are arranged, except for the region where the three weighing units W1~W3 are arranged adjacent each other and which is surrounded by the three weighing units W1~W3. For example, the six weighing hoppers 4 may be arranged at a pitch equal to the pitch at which seven weighing hoppers 4 are arranged. In this case, the diameter of the upper opening of the upper collecting chute 6A, 6B, 6C is slightly larger than (⅞ of) that in the case where six weighing hoppers 4 are arranged at the aforesaid pitch on an entire circumference. But, no weighing hopper 4 and no feeding hopper 3 are disposed in the region where the three weighing units W1~W3 are arranged adjacent each other and which is surrounded by the three weighing units W1~W3. This facilitates a dismounting work or a mounting work of the weighing hoppers 4 and the feeding hoppers 3 when they are cleaned, repaired, etc.

In the example of FIG. 7, no weighing hopper 4 is disposed in the region where the three weighing units W1~W3 are arranged adjacent each other. Alternatively, the weighing hopper 4 in only one of two arbitrary weighing units adjacent each other is disposed in a region where these weighing units are adjacent each other. In this case, by arranging the weighing hoppers 4 of adjacent weighing units such that they are not adjacent each other, a dismounting work or a mounting work of the weighing hoppers 4 and the feeding hoppers 3 is facilitated when they are cleaned, repaired, etc.

In the example of FIG. 6(b), by arranging the weighing hoppers 4 of adjacent weighing units such that they are not adjacent each other and are not opposite to each other in the region where the three weighing units W1~W3 are arranged adjacent each other, a dismounting work or a mounting work of the weighing hoppers 4 and the feeding hoppers 3 is facilitated when they are cleaned, repaired, etc. The same applies to the configuration of FIG. 1.

In this Embodiment, it is desired that the weighing hoppers 4 in the respective weighing units be equal in number if possible, and if not, it is desired that a difference in number be one at the largest. In other words, when the total number of the weighing hoppers 4 in the combination weigher is integer times as many as the number of weighing units in the combination weigher, the numbers of the weighing hoppers 4 in the respective weighing units are set equal. If not, then the difference in the number of the weighing hoppers 4 between the weighing units is set to one at the largest. For example, when the total number of weighing hoppers 4 is fifteen and two weighing units W1, W2 are provided, the weighing unit W1 includes eight weighing hoppers 4 and the weighing unit W2 includes seven weighing hoppers 4. In this case, firstly, the diameter of the circle which is the arrangement shape of the weighing hoppers 4 in the weighing unit W1 including more weighing hoppers 4 is determined, and according to this, the size (diameter of the upper opening) of the upper collecting chute is determined. Then, in the weighing unit W2 including fewer weighing hoppers 4, the size of the upper collecting chute is set equal to the size of the upper collecting chute in the weighing unit W1, and seven weighing hoppers 4 are arranged at, for example, an equal pitch on a circumference of a circle which is equal in diameter to the circle which is the arrangement shape of the weighing hoppers 4 in the weighing unit W1. This can equalize the transportation distances and transportation time periods of the objects to be weighed which have been discharged from the weighing hoppers 4 and are sliding down on the respective upper collecting chutes in both of the weighing units W1, W2.

Embodiment 2

Figure 8:
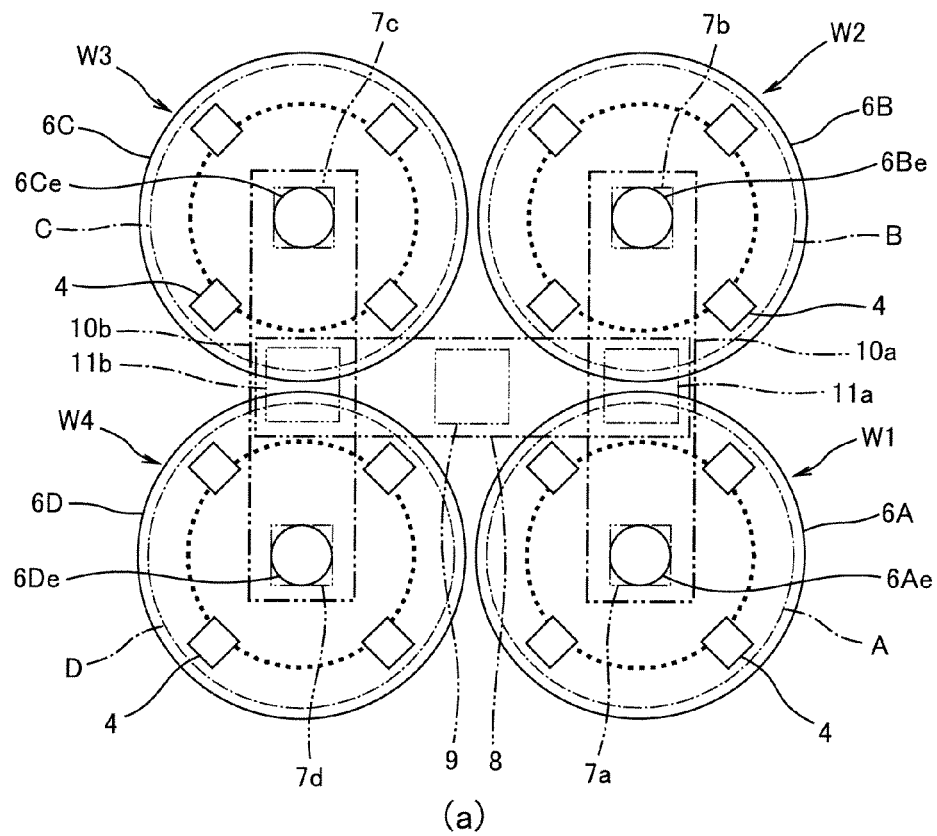
FIG. 8 (a) is a schematic view of upper collecting chutes and weighing hoppers of a combination weigher according Embodiment 2 of the present invention, as viewed from above.
Figure 8:
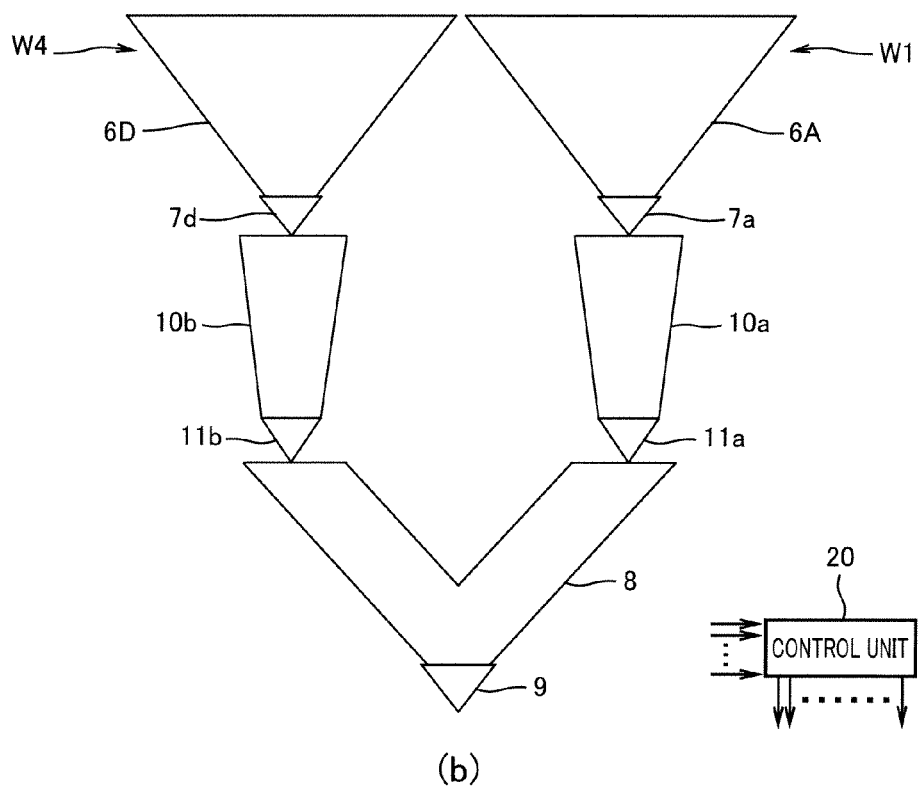

FIG. 8 (a) is a schematic view of upper collecting chutes and weighing hoppers of a combination weigher according Embodiment 2 of the present invention, as viewed from above, and FIG. 8(b) is a schematic view of upper, intermediate and lower collecting chutes of the combination weigher, as viewed from the front.

FIG. 8 shows an exemplary combination weigher including four weighing units, and is a schematic view of the upper collecting chutes and the weighing hoppers of the combination weigher as viewed from above.

In Embodiment 1, two stages, i.e., upper and lower collecting chutes are provided, whereas in this Embodiment, three stages, i.e., upper, intermediate and lower collecting chutes are provided.

The combination weigher includes four weighing units W1~W4 having the same configuration as that of the weighing units W1, W2 of FIG. 1, two sets of intermediate collecting chutes 10a, 10b and intermediate collecting hoppers 11a, 11b, the lower collecting chute 8, the lower collecting hopper 9 and the control unit 20.

The groups A~D of the weighing hoppers in the four weighing units W1~W4 are arranged such that the centers of the circles which are arrangement shapes of the weighing hoppers 4 are positioned at the vertexes of an equilateral square, and according to this, the centers of the circles which are their upper opening shapes of the four upper collecting chutes 6A~6D are positioned at the vertexes of the square.

The single intermediate collecting chute 10a is provided below the upper collecting hoppers 7a, 7b of the two weighing units W1, W2, and the intermediate collecting hopper 11a is disposed at the discharge outlet of the bottom part of the intermediate collecting chute 10a. Likewise, the single intermediate collecting chute 10b is provided below the upper collecting hoppers 7c, 7d of the two weighing units W3, W4, and the intermediate collecting hopper 11b is disposed at the discharge outlet of the bottom part of the intermediate collecting chute 10b. Further, the single lower collecting chute 8 is provided below the two intermediate collecting hoppers 11a, 11b and the lower collecting hopper 9 is provided at the discharge outlet of the lower collecting chute 8. The upper collecting hoppers 7a~7d are provided at discharge outlets 6Ae~6De of the upper collecting chutes 6A~6D of the weighing units W1~W4, respectively.

The specific positional relationship between the weighing hoppers 4 and the upper collecting chutes 6A~6D, and the configurations of gates of the weighing hoppers 4 are identical to those of FIG. 4(a) described in Embodiment 1. Also, the positional relationship between the upper collecting hoppers 7a, 7b and the intermediate collecting chute 10a and the configurations of the gates of the upper collecting hoppers 7a, 7b, the positional relationship between the upper collecting hoppers 7c, 7d and the intermediate collecting chute 10b and the configurations of the gates of the upper collecting hoppers 7c, 7b, and the positional relationship between the intermediate collecting hoppers 11a, 11b and the lower collecting chute 8 and the configurations of the gates of the intermediate collecting hoppers 11a, 11b are identical to the positional relationship between the upper collecting hoppers 7a, 7b and the lower collecting chutes 8, and the configurations of the gates of the upper collecting hoppers 7a, 7b shown in FIG. 4(b) described in Embodiment 1.

The other constituents are identical to those of Embodiment 1 and will not be described repetitively. In addition, the operation of the dispersion feeders 1, the linear feeders 2 and the feeding hoppers 3 (see FIG. 1) included in the weighing units W1~W4 are identical to those of Embodiment 1 and will not be described repetitively. As in Embodiment 1, the same kinds of objects to be weighed are supplied to the dispersion feeders 1 (see FIG. 1) of the weighing units W1~W4 and the same kinds of objects to be weighed are fed to all of the weighing hoppers 4 included in the combination weigher.

The control unit 20 controls the operation of the entire combination weigher and performs a combination process to determine a combination (discharge combination) made up of the weighing hoppers 4 which should discharge the objects to be weighed, from among the weighing hoppers 4 in the groups A~D, as in Embodiment 1.

In this configuration, the objects to be weighed which have been discharged from the weighing hoppers 4 making up the discharge combination slide down on the upper collecting chutes 6A~6D, are held in the upper collecting hoppers 7a~7d and thereafter are discharged from the upper collecting hoppers 7a~7d. The objects to be weighed which have been discharged from the upper collecting hoppers 7a, 7b slide down on the intermediate collecting chute 10a and are held in the intermediate collecting hopper 11a. In the same manner, the objects to be weighed which have been discharged from the upper collecting hoppers 7c, 7d slide down on the intermediate collecting chute 10b and are held in the intermediate collecting hopper 11b. The objects to be weighed which have been discharged from the intermediate collecting hoppers 11a, 11b, slide down on the lower collecting chute 8, are held in the lower collecting hopper 9 and thereafter are discharged from the lower collecting hopper 9 into, for example, the inlet of the packaging machine shown in FIG. 14.

Figure 9:
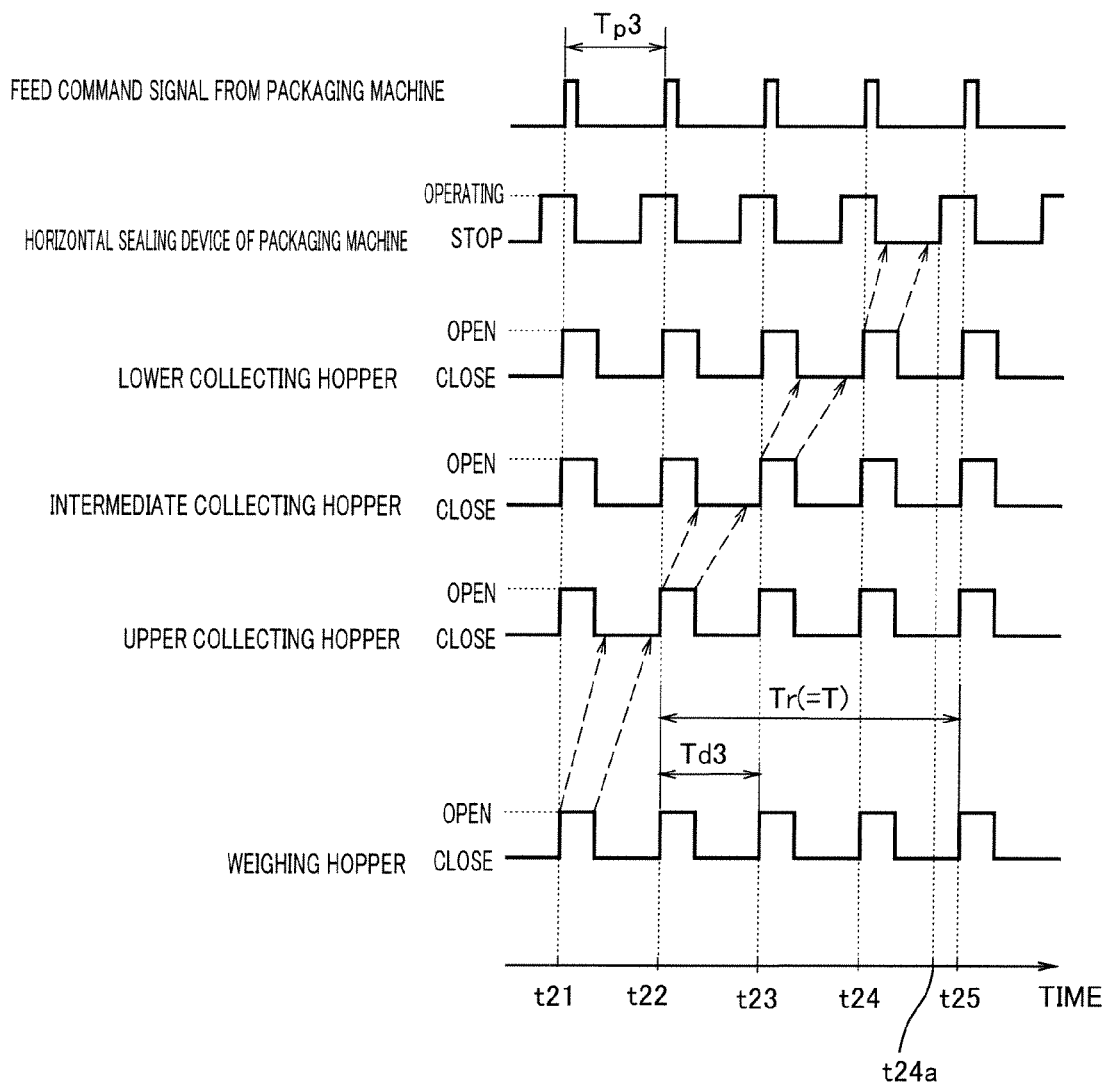
FIG. 9 is a timing chart showing an example of the opening and closing operation of the gates of collecting hoppers, the opening and closing operation of the gates of the weighing hoppers, and the operation of the horizontal sealing device of the packaging machine, in a case where the combination weigher of Embodiment 2 of the present invention is configured to perform a triple shift operation.

FIG. 9 is a timing chart showing an example of the opening and closing operation of the gates of collecting hoppers, the opening and closing operation of the gates of the weighing hoppers, and the operation of a horizontal sealing device of a packaging machine, in a case where the combination weigher of this Embodiment is configured to perform a triple shift operation. FIG. 9 shows an example in which the actual weighing cycle time Tr is equal to the ideal weighing cycle time T, that is, the combination weigher is operated at a maximum speed, and the discharge cycle time Td3 associated with the weighing hopper 4 is ⅓ of the actual weighing cycle time Tr (=T) and is equal to a packaging cycle time Tp3.

In the configuration for causing the combination weigher to perform the triple shift operation, favorable weighing accuracy is achieved, for example, by setting the number of the weighing hoppers 4 in each of the groups A~D in the weighing units W1~W4 to five, by setting the total number of weighing hoppers 4 to twenty, and by setting the number of weighing hoppers 4 which would be selected in the combination process to five.

In the triple shift operation, once every time Tr/3, the combination process is performed, and the weighing hoppers 4 selected to make up the discharge combination in the combination process discharge the objects to be weighed. Therefore, once every time Tr/3, the combination process is repeated, and the weighing hoppers 4 making up the discharge combination sequentially determined discharge the objects to be weighed to the upper collecting chutes 6A~6D. Correspondingly, all of the upper collecting hoppers 7a~7d discharge the objects to be weighed simultaneously once every time Tr/3, both of the intermediate collecting hoppers 11a, 11b discharge the objects to be weighed simultaneously once every time Tr/3, and the lower collecting hopper 9 discharges the objects to be weighed once every time Tr/3. Thereby, the objects to be weighed are fed to the packaging machine once every time Tr/3.

Under the state where the combination weigher is operated continuously, the control unit 20 opens the gate of the lower collecting hopper 9 and discharges the objects be weighed to the packaging machine, in response to, for example, a feed command signal received from the packaging machine (time t21, t22, t23, . . . ).

In the configuration of FIG. 9, for example, the objects to be weighed which have been discharged from the weighing hopper 4 by opening of the gate at time t21 are collected into the upper collecting hopper 7a~7d and held therein until time t22, the objects to be weighed which have been discharged from the upper collecting hopper 7a~7d by opening of the gate at time t22 are collected into the intermediate collecting hopper 11a, 11b and held therein until time t23, the objects to be weighed which have been discharged from the intermediate collecting hopper 11a, 11b by opening of the gate of the intermediate collecting hopper 11a, 11b at time t23 are collected into the lower collecting hopper 9, are held therein until time t24, and are discharged to the inlet of the packaging machine by opening of the gate of the lower collecting hopper 9 at time t24. The objects to be weighed which have been discharged by opening of the gate of the lower collecting hopper 9 at time t24 are fed to the packaging machine before time t24a when the horizontal sealing device 55 of the packaging machine starts the horizontal sealing, and horizontal sealing for sealing a portion corresponding to the upper end of the package bag starts at time t24a.

By causing the combination weigher to perform the triple shift operation as described above, the objects to be weighed are discharged to the packaging machine once every time Tr/3 and a high-speed discharge operation which is three times as high as the speed of the single shift operation is achieved. Thus, the combination weigher can be adapted to the packaging machine operating at a high speed.

The combination weigher of this Embodiment may be configured to perform a fourth shift operation described below. As used herein, the "fourth shift operation" refers to an operation in which a discharge cycle time is ¼ of an actual weighing cycle time. In other words, a discharge cycle time (Td4) associated with the weighing hopper 4 is ¼ of the actual weighing cycle time. In addition, it is also supposed that the actual weighing cycle time Tr is equal to the ideal weighing cycle time T.

In the configuration for causing the combination weigher to perform the fourth shift operation, favorable weighing accuracy is achieved, for example, by setting the number of the weighing hoppers 4 in each of the groups A and D to five, by setting the number of the weighing hoppers 4 in each of the groups B and C to six, by setting the total number of weighing hoppers 4 to twenty two, and by setting the number of weighing hoppers 4 which would be selected in the combination process to four.

In the fourth shift operation, once every time Tr/4, the combination process is performed, and the weighing hoppers 4 selected to make up the discharge combination in the combination process discharge the objects to be weighed. Therefore, once every time Tr/4, the combination process is repeated, and the weighing hoppers 4 making up the discharge combination sequentially determined discharge the objects to be weighed to the upper collecting chutes 6A~6D. Correspondingly, all of the upper collecting hoppers 7a~7d discharge the objects to be weighed simultaneously once every time Tr/4, all of the intermediate collecting hoppers 11a, 11b discharge the objects to be weighed simultaneously once every time Tr/4, and the lower collecting hopper 9 discharges the objects to be weighed once every time Tr/4. Thereby, the objects to be weighed are fed to the packaging machine once every time Tr/4.

By causing the combination weigher to perform the fourth shift operation as described above, the objects to be weighed are discharged to the packaging machine once every time Tr/4 and a high-speed discharge operation at a speed which is four times as high as the speed of the single shift operation is achieved. Thus, the combination weigher can be adapted to the packaging machine operating at a high-speed.

Although the timings of the gate opening and closing operations of the lower collecting hopper 9, the intermediate collecting hoppers 11a, 11b, the upper collecting hoppers 7a~7d and the weighing hoppers 4 are set equal in the example (FIG. 9, etc), they may be set different. For example, the control unit 20 causes the lower collecting hopper 9 to start opening of the gate after a predetermined time D11 (≧0) from when the feed command signal is received from the packaging machine, causes the intermediate collecting hopper 11a, 11b to start opening of the gate after a predetermined time D12 (≧0) from when the feed command signal is received, causes the upper collecting hopper 7a~7d to start opening of the gate after a predetermined time D13 (≧0) from when the feed command signal is received, and causes the weighing hopper 4 to start opening of the gate after a predetermined time D14 (≧0) from when the feed command signal is received, and sets D11, D12, D13, and D14 as desired. In this way, the timings when the hoppers 4, 7a~7d, 9, 11a, 11b open their gates can be set as desired.

Alternatively, the control unit 20 may individually control the timings when the upper collecting hoppers 7a, 7b open and close their gates such that the timings when the two upper collecting hoppers 7a, 7b start discharging of the objects to be weighed are different a little. This makes it possible to lessen the collision between the objects to be weighed discharged from the upper collecting hopper 7a and the objects to be weighed discharged from the upper collecting hopper 7b and to prevent damage to the objects to be weighed. Likewise, the control unit 20 may individually control the timings when the upper collecting hoppers 7c, 7d open and close their gates such that the timings when the two upper collecting hoppers 7c, 7d start discharging of the objects to be weighed are different a little. This makes it possible to lessen the collision between the objects to be weighed discharged from the upper collecting hopper 7c and the objects to be weighed discharged from the upper collecting hopper 7d and to prevent damage to the objects to be weighed. Likewise, the control unit 20 may individually control the timings when the intermediate collecting hoppers 11a, 11b open and close their gates such that the timings when the two intermediate collecting hoppers 11a, 11 start discharging of the objects to be weighed are different a little. This makes it possible to lessen the collision between the objects to be weighed discharged from the intermediate collecting hopper 11a and the objects to be weighed discharged from the intermediate collecting hopper 11b and to prevent damage to the objects to be weighed.

In the configuration of FIG. 8, if the number of the weighing hoppers 4 is equal between the weighing units, the diameter of the upper opening of each of the upper collecting chutes 6A, 6B, 6C, 6D can be reduced to about ¼ of that of the conventional example of FIG. 13 and the installation area of the entire combination weigher can be reduced to about ¼ of that of the conventional example of FIG. 13, if the arrangement pitch and total number of the weighing hoppers 4 are equal to those of the conventional example of FIG. 13. If the tilting angle of the chute surface of the collecting chute is set equal, the height of the upper collecting chutes 6A, 6B, 6C, 6D can be reduced to about ¼ of the height of the collecting chute 6 of FIG. 13. In the case where no weighing hopper 4 is provided in the region which is surrounded by the four weighing units W1~W4 to facilitate a mounting work or a dismounting work of the weighing hoppers 4 and the feeding hoppers 3, the diameter of the upper opening of the upper collecting chute 6A~6D is slightly larger than (⅔ of) that in the case where the weighing hoppers 4 are arranged on an entire circumference. In this case, the weighing hopper 4 in only one of arbitrary two weighing units located adjacent each other may be disposed in a region where they are adjacent each other.

As described in Embodiment 1, it is desired that the weighing hoppers 4 in the respective weighing units be equal in number if possible, and if not, it is desired that a difference in number be one at the largest. In the case where the weighing hoppers 4 in the respective weighing units are different in number, for example, the weighing hoppers 4 in each of the groups A and D is set to five and the weighing hoppers 4 in each of the groups B and C is set to six as illustrated in this Embodiment, firstly, the diameter of the circle which is the arrangement shape of the weighing hoppers 4 in the weighing units W2, W3 having the groups B, C including more weighing hoppers 4 is determined, and according to this, the size (diameter of the upper opening) of the upper collecting chute 6B, 6C is determined. Then, in the weighing units W1, W4 having the groups A, D including fewer weighing hoppers 4, the size of the upper collecting chutes 6A, 6D is set equal to the size of the upper collecting chutes 6B, 6C in the weighing units W2. W3, and five weighing hoppers 4 are arranged at, for example, an equal pitch on a circumference of a circle which is equal in diameter to the circle which is the arrangement shape of the weighing hoppers 4 in each of the weighing units W2, W3. This can equalize the transportation distances and transportation time periods of the objects to be weighed which have been discharged from the weighing hoppers 4 and are sliding down on the respective upper collecting chutes 6A~6D in all of the weighing units W1~W4.

In Embodiment 2, as in Embodiment 1, since the weighing hoppers 4 in the combination weigher are separated into those belonging to the plural weighing units W1~W4, the diameter of the upper opening and height of each of the upper collecting chutes 6A~6D can be made smaller than those of the collecting chute 6 in the conventional example of FIG. 13, if the arrangement pitch and the total number of the weighing hoppers 4 are equal to those of the conventional example of FIG. 13. Since the size of the upper collecting chutes 6A~6D can be reduced as described above, the transportation distance and transportation time period of the objects to be weighed which are moving down (sliding down) on the upper collecting chutes 6A~6D can be reduced, and the objects to be weighed which have been discharged from the weighing hoppers 4, can be collected into the upper collecting hoppers 7a~7d in a state where its batch length is still small and can be held therein in a lump state. For this reason, even in the objects to be weighed, having a characteristic in which its batch time on the collecting chute tends to be long, even in the case where the total number of the weighing hoppers 4 is large, or even in the case where the capacity of the weighing hopper 4 is large and therefore the arrangement pitch of the weighing hoppers 4 must be set longer, it is possible to reduce the batch time of the objects to be weighed on the upper collecting chutes 6A~6D.

As in the lower collecting chute 8 of Embodiment 1, since the objects to be weighed are discharged in a lump state to the intermediate collecting chutes 10a, 10b and the lower collecting chute 8 from the collecting hoppers 7a~7d and 11a, 11b which are located thereabove, and the size of the intermediate collecting chutes 10a, 10b, and the size of the lower collecting chute 8 are reduced, it is possible to reduce the transportation distance and transportation time period of the objects to be weighed which are moving down (sliding down) on each of the collecting chutes 10a, 10b, 8. And, even in the objects to be weighed, having a characteristic in which its batch time on the collecting chute tends to be long, even in the case where the total number of the weighing hoppers 4 is large, or even in the case where the capacity of the weighing hopper 4 is large and therefore the arrangement pitch of the weighing hoppers 4 must be set longer, it is possible to reduce the batch time of the objects to be weighed on the intermediate collecting chutes 10a, 10b and the lower collecting chute 8. Furthermore, because of the presence of the lower collecting hopper 9, the objects to be weighed can be discharged to the packaging machine in a lump state.

As should be understood from the above, it is possible to reduce the batch time of the objects to be weighed on each of the upper, intermediate and lower collecting chutes, regardless of the characteristic of the objects to be weighed, the number of the weighing hoppers 4, etc, thereby enabling a high-speed operation.

By setting the batch time of the objects to be weighed on each of the upper, intermediate and lower collecting chutes to a time which is not longer than a certain time (allowable batch time) supposed for each shift operation and each collecting chute, in the configuration in which the above mentioned operation such as the triple shift operation, the fourth shift operation, etc is performed, a high-speed operation without decreasing the operation speed.

The allowable batch time supposed for each shift operation and each collecting chute is, for example, a time obtained by subtracting a batch inhibiting time S which is set for each collecting chute from a desired discharge cycle time (Td3, Td4) for each operation. In this case, by setting a desired discharge cycle time Td3=T/3 (T: ideal weighing cycle time) when the triple shift operation is performed, the operation at a maximum speed is achieved. Likewise, by setting a desired discharge cycle time Td4=T/4 when the fourth shift operation is performed, the operation at a maximum speed is achieved. In the configuration of FIG. 8, for example, the batch inhibiting time S for the upper collecting chutes 6A~6D is a time period when the gates of the upper collecting hoppers 7a~7d are open to discharge the objects to be weighed, the batch inhibiting time S for the intermediate collecting chutes 10a, 10b is a time period when the gates of the intermediate collecting hoppers 11a, 11b are open to discharge the objects to be weighed, and the batch inhibiting time S for the lower collecting chute 8 is a time period when the gate of the lower collecting hopper 9 is open to discharge the objects to be weighed. As described later, if the lower collecting hopper 9 is omitted, the batch inhibiting time S for the lower collecting chute 8 may be set to a time period which does not impede the operation (e.g., horizontal sealing operation) of the packaging machine located therebelow. The batch time of the objects to be weighed for the upper, intermediate and lower collecting chutes may be determined by, for example, conducting a test (e.g., test using a test machine) using the objects to be weighed which this combination weigher will weigh.

The collecting chutes and other members are designed and manufactured so that the batch time of the objects to be weighed on each of the upper, intermediate and lower collecting chutes is not longer than the allowable batch time and mixing on each collecting chute between the objects to be weighed which are discharged previously and the objects to be weighed which are discharged next is prevented, as described above.

Therefore, in this Embodiment, the upper collecting chutes 6A~6D, the intermediate collecting chutes 10a, 10b and the lower collecting chute 8 may be configured based on a desired discharge cycle time, etc, similarly to the upper collecting chutes 6A, 6B, and the lower collecting chute 8 in Embodiment 1.

Having described above that the actual weighing cycle time Tr is equal to the ideal weighing cycle time T, the actual weighing cycle time Tr may be set longer than the ideal weighing cycle time T by determining the weighing speed of the combination weigher according to the maximum speed of the packaging machine as described in Embodiment 1. By determining the weighing speed of the combination weigher according to the maximum speed of the packaging machine and by configuring the upper, intermediate and lower collecting chutes (6A~6D, 10a, 10b, 8), etc, based on a discharge cycle time according to a weighing speed, etc, the combination weigher can operate at the weighing speed according to the maximum speed of the packaging machine and the packaging machine can operate at the maximum speed.

Since the transportation distance over which the objects to be weighed slide down on each of the upper collecting chutes 6A~6D, the intermediate collecting chutes 10a, 10b and the lower collecting chute 8 is short, the maximum speed of the objects to be weighed which are sliding down is suppressed to a low one. Thus, the impact generated when the objects to be weighed collide with each other, or the impact generated when the objects entering the collecting hoppers 7a~7d, 11a, 11b, 9 collide against the inner wall of these collecting hopper is mitigated, thereby preventing the damage to the objects to be weighed.

In Embodiment 2, as in Embodiment 1, the size of the upper collecting hoppers 7a~7d can be reduced, by configuring the setting in the combination process so that at least one weighing hopper 4 is selected without fail from those of two or more of the groups A~D of the plural weighing hoppers 4 to make up the discharge combination, or a maximum number of the weighing hoppers 4 selected from those of each of the groups A~D is limited to less than the number of the weighing hoppers 4 which would be selected. In the same manner, the size of the intermediate collecting hoppers 11a, 11b can be reduced, by configuring the setting so that at least one of the weighing hoppers 4 selected to make up the discharge combination is selected without fail from those of each of a first group set consisting of the groups A and B and a second group set consisting of the groups C and D, or by limiting a maximum number of the weighing hoppers 4 selected from those of each of the two group sets to less than the number of the weighing hoppers 4 which would be selected.

In this Embodiment, if the batch length of the objects to be weighed on the lower collecting chute 8 is small, the length of a batch of the objects to be weighed which are discharged from the discharge outlet at the bottom part of the lower collecting chute 8 can be made small without the lower collecting hopper 9 and the packaging operation of the packaging machine is not impeded without the lower collecting hopper 9, the lower collecting hopper 9 may be omitted. In this case, the objects to be weighed which have been discharged from the intermediate collecting hopper 11a, 11b are discharged to the inlet of the packaging machine via the lower collecting chute 8. Because of the omission of the lower collecting hopper 9, the configuration is simplified and the control therefor becomes unnecessary.

If the objects to be weighed can be directly fed from the intermediate collecting hopper 11a, 11b to a single packaging machine inlet, the lower collecting chute 8 and the lower collecting hopper 9 may be omitted. For example, if the inlet of the packaging machine has an upper part of a large area and its opening diameter is large, the intermediate collecting chutes 10a, 10b may be configured such that the two intermediate collecting hoppers 11a, 11b are closer to the packaging machine inlet to directly feed the objects to be weighed which have been discharged from the intermediate collecting hoppers 11a, 11b to the packaging machine inlet. In this case, because of the omission of the lower collecting chute 8 and the lower collecting hopper 9, the configuration is simplified, and the control for the lower collecting hopper 9 may be omitted, as in the above case where the lower collecting hopper 9 is not provided. It may be said that in this case, the two intermediate collecting chutes 10a, 10b serve as the lower collecting chute and the intermediate collecting hoppers 11a, 11b serve as the lower collecting hopper.

As in the configuration (FIG. 6(b)) in which the three weighing units W1~W3 are aligned in a straight-line shape in Embodiment 1, the four weighing units W1~W4 may be aligned in a straight-line shape.

Also, as in Embodiment 1, a single lower collecting chute and a single lower collecting hopper may receive the objects to be weighed which have been discharged from the upper collecting hoppers 7a~7d of all of the weighing units W1~W4 and may discharge them to the packaging machine inlet (e.g., FIG. 6(a)).

Although the two-stage collecting chute configuration, i.e., upper and lower collecting chutes has been described in Embodiment 1 and the three-stage collecting chute configuration, i.e., upper, intermediate and lower collecting chutes has been described in Embodiment 2, the collecting chutes may be provided in four or more stages in the same manner. The number of stages of the collecting chutes may be determined in view of the number, arrangement and the like of the weighing units. The number of weighing units may be determined in view of the characteristic of the objects to be weighed, the total number of the weighing hoppers 4, etc. For example, the number of the weighing units may be set larger when the objects to be weighed whose batch time on the collecting chute tends to be long is used, or when the total number of the weighing hoppers 4 is larger and therefore a diameter of a circular form formed by arranging all of the weighing hoppers 4 is larger.

In any case, since it is sufficient that the collecting chutes located below the upper collecting chutes in the weighing unit collect the objects to be weighed which have been discharged from the collecting hopper located thereabove into the discharge outlet at the bottom part thereof, like the above mentioned lower collecting chute 8 of FIG. 1, a simple configuration may be achieved using gutter-shaped members.

Subsequently, a modification of the weighing units used in the above Embodiments will be described.

Figure 10:
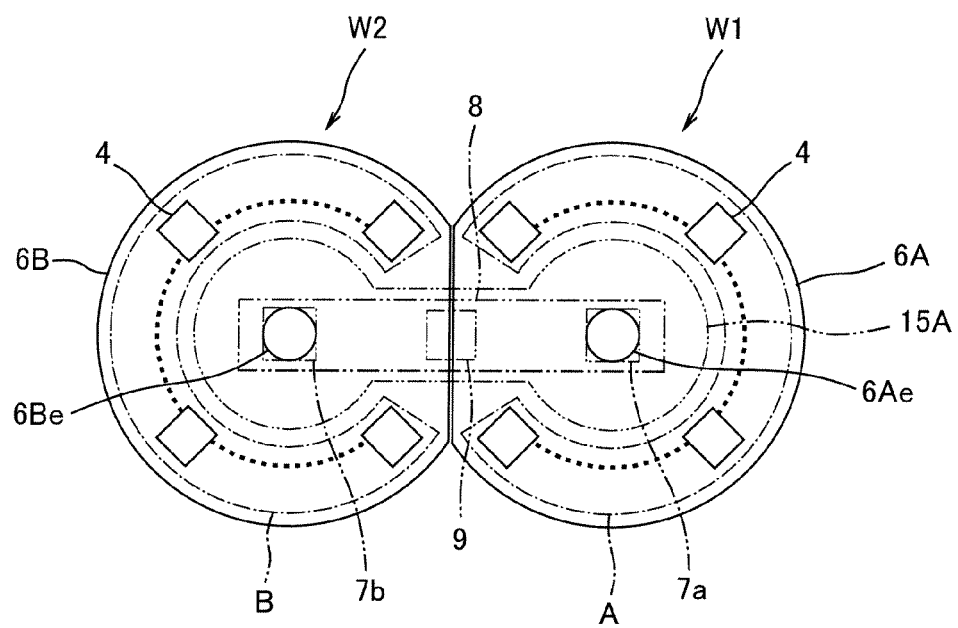
FIG. 10 is a schematic view of upper collecting chutes and weighing hoppers of a combination weigher, showing a modification of the weighing units of FIG. 1, as viewed from above.

FIG. 10 is a schematic view of upper collecting chutes and weighing hoppers of an exemplary combination weigher including a modification of the weighing units W1, W2 of FIG. 1, as viewed from above.

In the configuration of FIG. 10, no weighing hopper 4 is disposed in a region where the two weighing units W1, W2 are adjacent in the configuration of FIG. 1. The weighing units W1, W2 are configured to have groups A and B in which the weighing hoppers 4 are arranged in a circular-arc shape (C-shape). In this case, the two groups A, B of the weighing hoppers 4 are respectively groups which include the plural weighing hoppers 4 arranged along the inner sides of two different imaginary circles. In these groups, the two imaginary circles partially overlap with each other and no weighing hopper 4 is disposed in circular-arc regions of the imaginary circles corresponding to the overlapping region.

In the configuration of FIG. 10, the two center base bodies 15 of FIG. 1 may be joined to each other to form a single center base body 15A. The feeding hoppers 3 (see FIG. 1) in each of the weighing units W1, W2 are arranged in the circular-arc form (C-shape) to correspond to the weighing hoppers 4. Above the center base body 15A, the two dispersion feeders 1 and the plural linear feeders 2 shown in FIG. 1 are disposed. The linear feeders 2 may be arranged according to the arrangement of the feeding hoppers 3 and each dispersion feeder 1 may be configured to feed the objects to be weighed to the linear feeders 2.

In the configuration of FIG. 10, no weighing hopper 4 and no feeding hopper 3 are disposed in the region where the two weighing units W1, W2 are adjacent. This facilitates a mounting work or a dismounting work of the weighing hoppers 4 and the feeding hoppers 3 when they are cleaned, repaired, etc. However, if the weighing hoppers 4 of a certain number are arranged at constant intervals, it is necessary to increase the diameter of the imaginary circle as the area of the overlapping region of the two imaginary circles increases. The diameter of the two imaginary circles in the configuration of FIG. 1 in which the weighing hoppers 4 are arranged along the inner sides of the two imaginary circles having no overlapping region can be reduced to a half of the diameter of a single imaginary circle (conventional imaginary circle) formed by arranging all of the weighing hoppers 4 along the inner side of the conventional imaginary circle in the conventional example shown in FIG. 13, thereby reducing the size of the upper collecting chute. To achieve at least 50% of a diameter reducing effect (to make the diameter of the two imaginary circles not larger than ¾ of the diameter of the conventional imaginary circle), it is desired that the center angles of the circular-arc regions corresponding to the overlapping region of the two imaginary circles be set to 120 degrees or smaller. This is the case where the diameters of the two imaginary circles are equal and the center angles of the above circular-arc regions is 120 degrees when the diameter of the two imaginary circles is ¾ of the diameter of the conventional imaginary circle.

The configurations of FIGS. 6(*a*), and 6(*b*) may be, in the same manner, such that no weighing hopper 4 is disposed in the regions where the three weighing units W1, W2, W3 are adjacent each other. In this case, the three center base bodies 15 (see FIG. 1) may be joined to each other to form a single center base body. In the same manner, in the configuration of FIG. 8, no weighing hoppers 4 may be disposed in the regions where the four weighing units W1, W2, W3, W4 are adjacent each other. In this case, the four center base bodies 15 (see FIG. 1) are joined to each other to form a single center base body. In the configuration of FIG. 8, for example, the two weighing units W1. W2 and the two weighing units W3, W4 may be configured as shown in FIG. 10.

In the Figures associated with Embodiment 1 and Embodiment 2, the weighing units are drawn to be located adjacent each other with a gap between them. It is desirable to arrange the weighing units without a gap (arrange the upper collecting chutes without a gap), because the distance between the upper collecting hoppers in adjacent weighing units is short, the size of the collecting chutes (e.g., the lower collecting chute 8 of FIG. 1, FIG. 6(*a*), FIG. 6(*b*), FIG. 7, and FIG. 10, the lower collecting chutes 8*a*, 8*b* of FIG. 11, and the intermediate collecting chutes 10*a*, 10*b*, the lower collecting chute 8, etc of FIG. 8) disposed below the weighing units can be reduced, and the transportation distance and transportation time period of the objects to be weighed which are sliding down on these collecting chutes can be reduced. On the other hand, in the configuration in which there is small gap between adjacent weighing units, a mounting work and a dismounting work of the upper collecting chutes is facilitated when the upper collecting chutes are cleaned, etc.

In Embodiment 1 and Embodiment 2, the weighing hoppers 4 in each weighing unit are arranged in a circular form, or they are arranged along the circumferences of the imaginary circles, but various alternations may be made. For example, in each weighing unit, the weighing hoppers 4 may be arranged in an annular shape including an oval shape, or a polygon shape having convex portion such as a square shape or a rectangular shape, instead of the circular form. According to the arrangement shape of the weighing hoppers 4, the feeding hoppers 3, the linear feeders 2, the upper collecting chutes, and others may be arranged. Nonetheless, it is desirable to arrange the weighing hoppers 4 on the circumference like Embodiment 1 and 2, because it is possible to equalize the transportation distances of the objects to be weighed which have been discharged from the respective weighing hoppers 4 on the upper collecting chutes and to reduce a batch time of the objects to be weighed on the upper collecting chutes.

Although in Embodiment 1 and Embodiment 2, the objects to be weighed which have been discharged from the combination weigher are fed to the single packaging machine inlet, two packaging machines or a twin-type packaging machine having two inlets may be disposed below the combination weigher and the objects to be weighed which have been discharged from the combination weigher may be fed alternately to the two packaging machine inlets (first and second packaging machine inlets). This configuration will be described with reference to FIG. 11.

Figure 11:
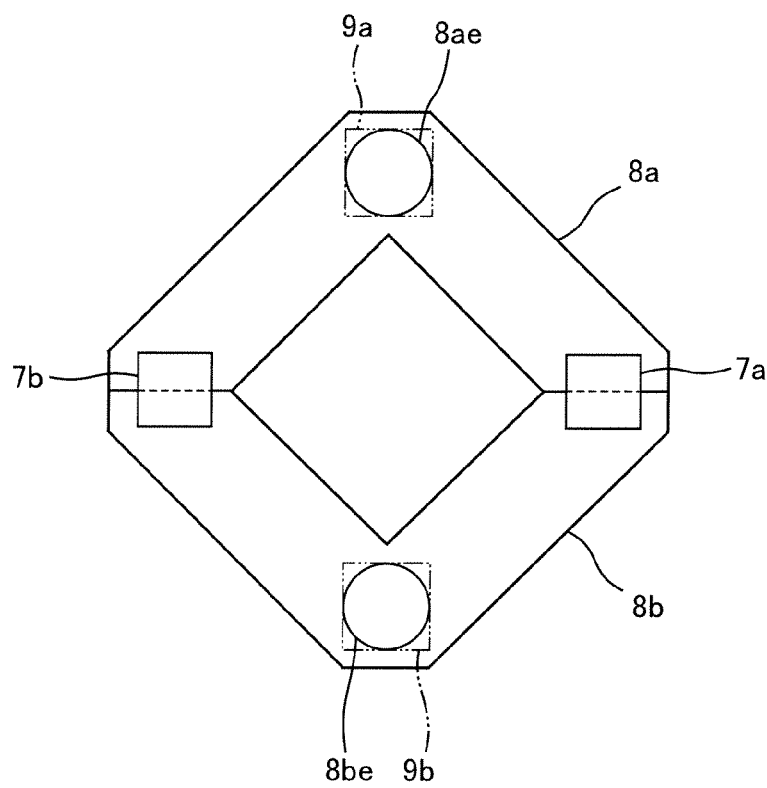
FIG. 11 is a plan view showing a configuration of lower collecting chutes in a case where the objects to be weighed which have been discharged from the combination weigher are fed to two packaging machine inlets.

FIG. 11 is a plan view showing a configuration of lower collecting chutes in a case where the objects to be weighed which have been discharged from the combination weigher are fed alternately to two packaging machine inlets.

For example, in the configuration of FIG. 1 in which the collecting chutes are provided in two stages, the single lower collecting chute 8 and the single collecting hopper 9 provided below the two upper collecting hoppers 7*a*, 7*b* are replaced by the two lower collecting chutes 8*a*, 8*b* provided with collecting hoppers 9*a*, 9*b* at discharge outlets 8*ae* and 8*be*, respectively, and the upper collecting hoppers 7*a*, 7*b* are each configured to selectively discharge the objects to be weighed to one of the two lower collecting chutes 8*a*, 8*b*. The objects to be weighed which have been discharged from the lower collecting hopper 9*a* are fed to a first packaging machine inlet, while the objects to be weighed which have been discharged from the lower collecting hopper 9*b* are fed to a second packaging machine inlet. In this case, the control unit 20 controls the upper collecting hoppers 7*a*, 7*b* so that the upper collecting hoppers 7*a*, 7*b* discharge the objects to be weighed alternately to the two lower collecting chutes 8*a*, 8*b* and are discharged to the same lower collecting chute simultaneously every time the weighing hopper 4 discharges the objects to be weighed. In this case, in response to the discharging of the objects to be weighed from the upper collecting hoppers 7*a*, 7*b* alternately to the two lower collecting chutes 8*a*, 8*b*, the two lower collecting hoppers 9*a*, 9*b* alternately discharge the objects to be weighed.

In this case, since it is sufficient that each of the two lower collecting chutes 8*a*, 8*b* collects the objects to be weighed which have been discharged from the upper collecting hoppers 7*a*, 7*b* into the lower collecting hoppers (9*a*, 9*b*) provided at the discharge outlets of the bottom parts thereof, they can be simply constructed by using gutter-shaped members. For example, the lower collecting chute 8*a* is constructed by using a first gutter-shaped member for guiding the objects to be weighed which have been discharged from the upper collecting hopper 7*a* to the lower collecting hopper 9*a* and a second gutter-shaped member for guiding the objects to be weighed which have been discharged from the upper collecting hopper 7*b* to the lower collecting hopper 9*a*. The lower collecting chute 8*b* may be constructed in the same manner.

In the configuration of FIG. 6(*b*) in which three weighing units are aligned in a straight-line shape, the objects to be weighed can be fed to the two packaging machine inlets in the same manner. In the configuration of FIG. 6(*a*), the structure of the lower collecting chutes is complicated a little, but the objects to be weighed can be fed to the two packaging machine inlets in a similar manner by providing the two lower collecting chutes to form two discharge paths.

In the configuration of FIG. 8 in which the collecting chutes are provided in three or more stages, the objects to be weighed can be fed to the two packaging machine inlets through two discharge paths. That is, when the collecting chutes are provided in m (m: 3 or more) stages, two sets of collecting chutes and collecting hoppers in (k+1)-th (k: any value in a range from 1 to m−1) stage to m-th stage are provided so that all of k-th stage collecting hoppers provided at discharge outlets of the k-th stage collecting chutes, among the collecting chutes in first stage (uppermost) to m-th stage (lowermost), may be configured to discharge the objects to be weighed selectively in one of the two directions, and the objects to be weighed which have been discharged alternately in the two directions from the k-th stage collecting hoppers are guided alternately to the two packaging machine inlets.

In the configuration in which the collecting chutes are provided in two stages or in three or more stages, if the two packaging machine inlets are in close proximity to each other, the lowermost collecting hopper may be configured to discharge the objects to be weighed selectively in one of the two directions (two packaging machine inlets) and the control unit 20 may be configured to control the lowermost collecting hopper to alternately discharge the objects to be weighed from the lowermost collecting hopper to the two packaging machine inlets, instead of the above mentioned configuration (e.g., configuration shown in FIG. 11).

Although in Embodiment 1 and Embodiment 2, the weighing hoppers 4 are exemplarily described as the combination hoppers which are hoppers (hoppers which participate in combination calculation) holding the objects to be weighed whose weight values are used in the combination calculation, the combination hoppers are not limited to the weighing hoppers 4. FIGS. 12(a), 12(b), 12(c), and 12(d) are views schematically showing other examples of hoppers such as the combination hoppers. The collecting chute 6X in FIGS. 12(a)~12(d) corresponds to the upper collecting chutes (6A~6D) described in the above embodiments.

Figure 12:
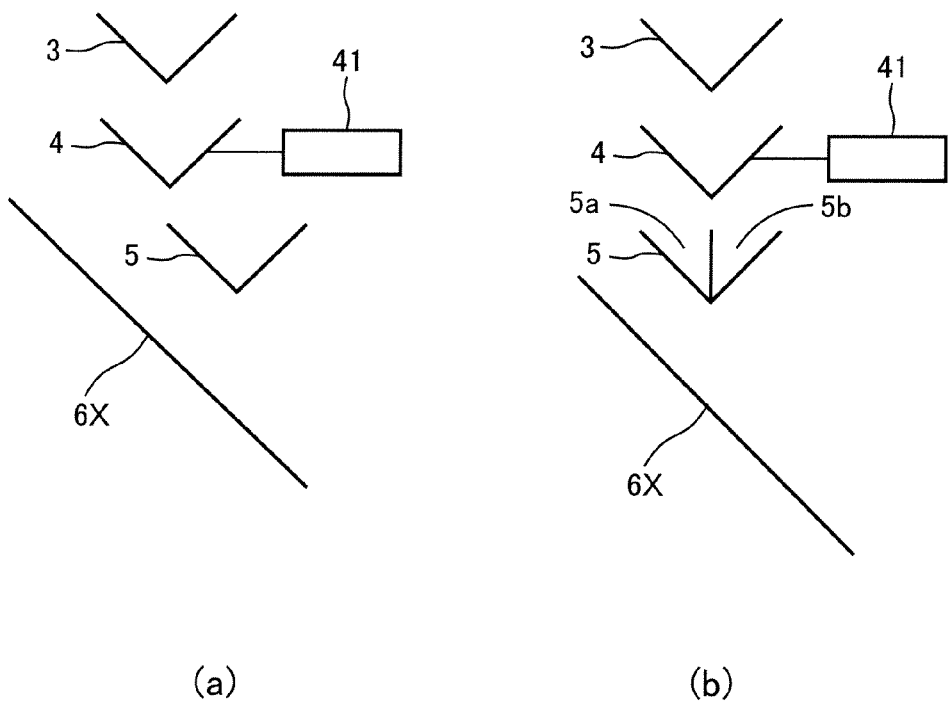
FIGS. 12 (a) to 12(d) are schematic views showing other examples of hoppers used in the combination weigher of Embodiment of the present invention.
Figure 12:
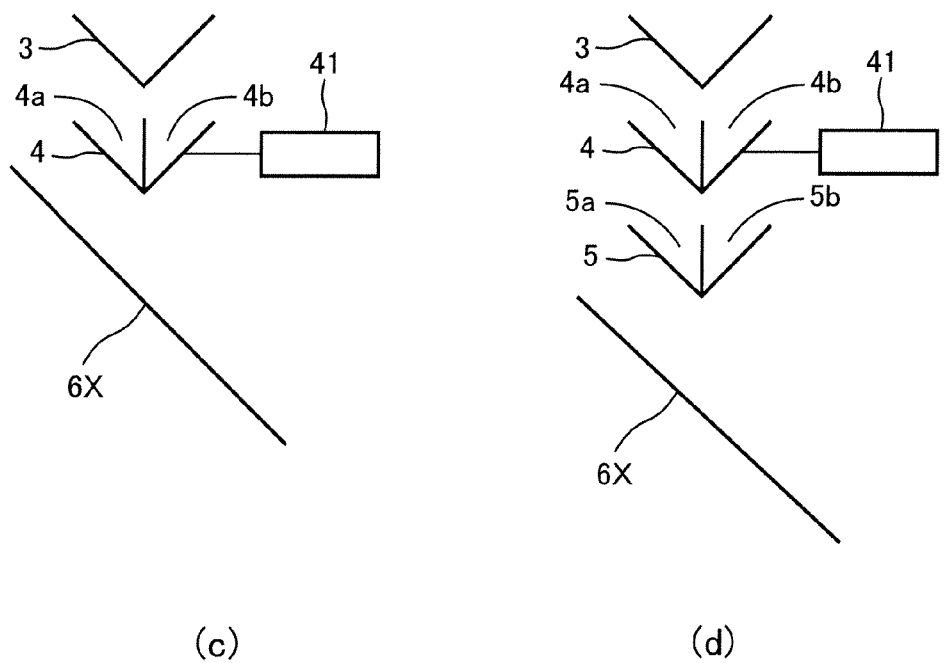

For example, as shown in FIG. 12(a), a memory hopper 5 may be disposed obliquely below each weighing hopper 4 and may participate in combination calculation. In this case, each weighing hopper 4 is configured to discharge the objects to be weighed selectively to the collecting chute 6X or to the memory hopper 5. When the memory hopper 5 is emptied, the weighing hopper 4 feeds the objects to be weighed to the memory hopper 5. The control unit 20 performs the combination process to determine a combination (discharge combination) of hoppers which should discharge the objects to be weighed, which are selected from among the plurality of weighing hoppers 4 and the plurality of memory hoppers 5, and causes the hoppers corresponding to the discharge combination to discharge the objects to be weighed onto the collecting chute 6X. As the weight of the objects to be weighed inside the memory hopper 5 which is used in the combination calculation in the combination process, the weight obtained by measurement in the weighing hopper 4 located thereabove is used.

As shown in FIG. 12(b), each memory hopper 5 may have two accommodating chambers 5a, 5b. In this case, the weighing hopper 4 is configured to discharge the objects to be weighed selectively to the accommodating chamber 5a or to the accommodating chamber 5b of the memory hopper 5, and is configured not to discharge the objects to be weighed to the collecting chute 6X. The two accommodating chambers 5a, 5b of each memory hopper 5 are each configured to discharge the objects to be weighed independently. Combination calculation is performed using weights of the objects to be weighed inside the accommodating chamber 5a, 5b of each memory hopper 5. The accommodating chambers 5a, 5b participate in combination calculation but the weighing hopper 4 does not participate in the combination calculation. As the weights of the objects to be weighed inside the accommodating chambers 5a, 5b, weights obtained by measurement in the weighing hopper 4 located thereabove are used. Each weighing hopper 4 can participate in the combination calculation provided that the weighing hopper 4 and either one of the accommodating chambers 5a, 5b of the associated memory hopper 5 are selected simultaneously to make up a combination. For example, when the weighing hopper 4 and the accommodating chamber 5a of the associated memory hopper 5 are selected simultaneously, the objects to be weighed inside the weighing hopper 4 are discharged onto the collecting chute 6X through the accommodating chamber 5a.

As shown in FIG. 12(c), each weighing hopper 4 may have two weighing chambers 4a, 4b. In this case, the feeding hopper 3 is configured to discharge the objects to be weighed selectively to the weighing chamber 4a or to the weighing chamber 4b of the weighing hopper 4, and the two weighing chambers 4a, 4b of the weighing hopper 4 are configured to independently discharge the objects to be weighed. The combination calculation is performed using the weights of the objects to be weighed inside the weighing chambers 4a, 4b in each weighing hopper 4, and the weighing chambers 4a, 4b participate in combination calculation. In the weighing hopper 4 having the two weighing chambers 4a, 4b, when one weighing chamber, for example, only the weighing chamber 4a holds the objects to be weighed, the weight of the objects to be weighed inside the weighing chamber 4a is measured by the weight sensor 41. When the weighing chamber 4b is fed with the objects to be weighed, the weight sensor 41 measures the total weight of the objects to be weighed inside the two weighing chambers 4a, 4b. The control unit 20 performs the combination calculation in such a manner that it calculates the weight of the objects to be weighed inside the weighing chamber 4b by subtracting the weight of the objects to be weighed inside the weighing chamber 4a from the total weight of the objects to be weighed inside the two weighing chambers 4a, 4b.

As shown in FIG. 12(d), each weighing hopper 4 may have two weighing chambers 4a, 4b, and the memory hopper 5 having the two accommodating chambers 5a, 5b respectively corresponding to the weighing chambers 4a, 4b of the weighing chamber 4 may be provided below the weighing hopper 4. In this case, the feeding hopper 3 is configured to discharge the objects to be weighed selectively to the weighing chamber 4a or to the weighing chamber 4b of the weighing hopper 4. The objects to be weighed inside the weighing chamber 4a of the weighing hopper 4 are sent out to the accommodating chamber 5a of the memory hopper 5, while the objects to be weighed inside the weighing chamber 4b of the weighing hopper 4 are sent out to the accommodating chamber 5b of the memory hopper 5. The combination calculation is performed using the weights of the objects to be weighed inside the accommodating chambers 5a, 5b of the memory hopper 5, and the accommodating chambers 5a, 5b participate in the combination calculation, but the weighing hopper 4 does not participate in the combination calculation. As the weights of the objects to be weighed inside the accommodating chambers 5a, 5b, the weights obtained by measurement and calculation associated with the weighing chambers 4a, 4b in the weighing hopper 4 located thereabove are used. The weighing chambers 4a, 4b of the weighing hopper 4 can participate in combination calculation provided that the weighing chamber 4a, 4b and the associated accommodating chamber 5a, 5b are selected simultaneously to make up a combination. For example, when the associated weighing chamber 4a and accommodating chamber 5a are selected simultaneously, the objects to be weighed inside the weighing chamber 4a are discharged onto the collecting chute 6X through the accommodating chamber 5a.

In addition to the above, the configuration of the hoppers such as the combination hoppers may be changed in various ways.

Although in the Embodiments 1 and 2, the control unit 20 is constituted by a microcomputer, etc, it is not limited to being configured as the single control apparatus, but instead may be each configured to include a plurality of control apparatuses which are disposed in a distributed manner and co-operate to control the operation of the combination weigher.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A combination weigher of the present invention is useful as a combination weigher which is coupled to a packaging machine operating at a high speed, etc.

The invention claimed is:

1. A combination weigher comprising:

plural weighing units each of which includes:

a combination hopper group including plural combination hoppers which are arranged along an inner side of a circumference of an imaginary circle and fed with objects to be weighed; and a collecting chute which is disposed below the combination hopper group and configured to collect the objects to be weighed which have been discharged from the combination hoppers and to discharge the objects to be weighed from a discharge outlet at a bottom part thereof;

wherein combination hopper groups of the respective weighing units include plural combination hoppers arranged on inner sides of circumferences of different imaginary circles, wherein the different imaginary circles partially overlap with each other to form at least one circular-arc shaped overlapping region, and wherein none of the plural combination hoppers are disposed in the circular-arc shaped overlapping region.

* * * * *

UNITED STATES PATENT AND TRADEMARK OFFICE
CERTIFICATE OF CORRECTION

PATENT NO. : 8,525,049 B2
APPLICATION NO. : 12/678728
DATED : September 3, 2013
INVENTOR(S) : Shozo Kawanishi It is certified that error appears in the above-identified patent and that said Letters Patent is hereby corrected as shown below:

Title Page
Item (76) Inventor:

Delete "Shozo Kawanishi, Nishinomiya (JP)" and replace with -- Shozo Kawanishi, Nishinomiya-shi (JP) --.

Signed and Sealed this
Twentieth Day of May, 2014

Michelle K. Lee
*Deputy Director of the United States Patent and Trademark Office*

UNITED STATES PATENT AND TRADEMARK OFFICE
CERTIFICATE OF CORRECTION

PATENT NO.      : 8,525,049 B2
APPLICATION NO. : 12/678728
DATED           : September 3, 2013
INVENTOR(S)     : Shozo Kawanishi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 587 days.

Signed and Sealed this

Fifteenth Day of September, 2015

Michelle K. Lee
*Director of the United States Patent and Trademark Office*